(12) United States Patent (10) Patent No.: US 9,394,401 B2
Yin et al. (45) Date of Patent: Jul. 19, 2016

(54) POLYOL ACRYLATES FOR USE IN ENERGY CURABLE INKS

(75) Inventors: Scott Yin, Buffalo Grove, IL (US); Michael E. O'Brien, Hainesville, IL (US); Mingzhe Wang, Vernon Hills, IL (US)

(73) Assignee: Stepan Company, Northfield, IL (US)

( * ) Notice: Subject to any disclaimer, the term of this patent is extended or adjusted under 35 U.S.C. 154(b) by 118 days.

(21) Appl. No.: 13/479,051

(22) Filed: May 23, 2012

(65) Prior Publication Data

US 2012/0245246 A1 Sep. 27, 2012

Related U.S. Application Data

(63) Continuation of application No. PCT/US2010/057864, filed on Nov. 23, 2010.

(60) Provisional application No. 61/264,036, filed on Nov. 24, 2009.

(51) Int. Cl.
*C08F 283/01* (2006.01)
*C08F 283/02* (2006.01)
*C08G 63/676* (2006.01)
*C09D 167/08* (2006.01)
*C08G 63/48* (2006.01)

(52) U.S. Cl.
CPC .............. *C08G 63/48* (2013.01); *C08F 283/01* (2013.01); *C08F 283/02* (2013.01); *C08G 63/676* (2013.01); *C09D 167/08* (2013.01)

(58) Field of Classification Search
CPC .... C08G 63/48; C08G 63/676; C08F 283/01; C08F 283/02; C09D 167/08
USPC .............................. 522/79; 106/504; 524/773
See application file for complete search history.

(56) References Cited

U.S. PATENT DOCUMENTS

| | | | |
|---|---|---|---|
| 3,389,104 A | 6/1968 | Austin et al. | |
| 4,035,320 A | 7/1977 | Lawson | |
| 4,144,283 A | 3/1979 | Matsubara | |
| 5,376,460 A * | 12/1994 | Hardeman et al. ............ | 428/482 |
| 5,859,113 A | 1/1999 | McIntyre et al. | |

(Continued)

FOREIGN PATENT DOCUMENTS

GB 2055389 3/1981

OTHER PUBLICATIONS

Extended European search report for Application No. 10833874.0, dated Feb. 25, 2014.

(Continued)

*Primary Examiner* — Michael Pepitone
*Assistant Examiner* — Jessica Roswell
(74) *Attorney, Agent, or Firm* — McAndrews, Held & Malloy, Ltd.

(57) ABSTRACT

Polyol acrylates are disclosed that are the reaction products of a modified polyol and a (meth)acrylic acid or derivative thereof. The modified polyols used in preparing the polyol acrylates are the reaction product of a natural oil or fatty carboxylic acid or derivative thereof with a polyol selected from the group consisting of polyester polyols, polyether polyols, polyester ether polyols and polyalcohols such that the natural oil or fatty carboxylic acid or derivative thereof is incorporated into the backbone of the polyol. The polyol acrylates are used to prepare pigment dispersions that are useful in formulating energy curable ink compositions.

27 Claims, 10 Drawing Sheets

(56) References Cited

U.S. PATENT DOCUMENTS

| | | |
|---|---|---|
| 6,133,329 A | 10/2000 | Shieh et al. |
| 6,569,352 B1 * | 5/2003 | Hillshafer et al. ....... 252/182.27 |
| 6,664,363 B1 * | 12/2003 | Faunce ....................... 528/295.5 |
| 2003/0004217 A1 * | 1/2003 | Kawamoto et al. ............. 521/50 |
| 2005/0068367 A1 | 3/2005 | Kato et al. |
| 2006/0036029 A1 | 2/2006 | Tomko et al. |
| 2007/0249751 A1 * | 10/2007 | Wang et al. ................... 522/178 |
| 2008/0108760 A1 * | 5/2008 | Mano et al. ................... 525/455 |
| 2008/0308005 A1 | 12/2008 | Deroover |
| 2009/0048375 A1 | 2/2009 | Deroover |

OTHER PUBLICATIONS

International Search Report and Written Opinion, mailed Jan. 31, 2011, for International Application No. PCT/US2010/057864.

* cited by examiner

> US 9,394,401 B2

POLYOL ACRYLATES FOR USE IN ENERGY CURABLE INKS

RELATED APPLICATIONS

This application is a continuation of International application Serial No. PCT/US2010/057864 (International Publication No. WO 2011/066313), having an International filing date of Nov. 23, 2010. The PCT application claims priority to U.S. provisional patent application Ser. No. 61/264,036, filed Nov. 24, 2009. The entire specifications of the PCT and provisional applications referred to above are hereby incorporated by reference.

BACKGROUND OF THE INVENTION

The present technology relates to new energy curable compositions, more particularly to energy curable compositions comprising polyester polyol acrylates, polyester ether polyol acrylates and/or polyether polyol acrylates that incorporate natural oils or fatty carboxylic acids into the backbone of the polyols. These natural oil-containing polyol acrylates are particularly suited for use in printing inks.

Polyol acrylates, such as polyester polyol acrylates, polyether polyol acrylates and epoxy acrylates, have been used for pigment dispersions in UV, Electron Beam (EB) or other energy curable printing inks. However, the current energy curable ink market requires better pigment wetting to produce stronger color, excellent rheological properties, and long term stability. Pigment loading and reducing the amounts of additives are also important concerns to ink manufacturers to reduce costs of manufacture. The market demands high quality ink with good pigment dispersibility, less pseudoplastic behavior, relatively low viscosity and fast cure. Therefore, there is a need for new polyester, polyether, and polyester ether polyol acrylates that can meet the demand for improved energy curable inks and supply excellent pigment wetting, high color strength, good curability and superior rheological performance.

BRIEF SUMMARY OF THE INVENTION

The presently described technology relates to novel energy curable compositions comprising polyol acrylates that have been modified by incorporating natural oils or fatty carboxylic acids into the backbone of the polyol. Such polyol acrylates provide one or more of the following benefits when formulated into pigment dispersions and/or energy curable ink compositions: improved pigment dispersibility and wettability, long-term stability, improved rheological properties, better color strength and gloss, and cost advantages.

In one aspect, the presently described technology provides a pigment dispersion comprising at least one polyol acrylate, wherein the polyol acrylate is the reaction product of a modified polyol and a (meth)acrylic acid or a derivative thereof, wherein the modified polyol is a reaction product of a natural oil or fatty carboxylic acid or derivative thereof reacted with a polyol selected from the group consisting of polyether polyols, polyester polyols, polyester ether polyols, and/or polyalcohols, such that natural oil or fatty carboxylic acid is incorporated into the backbone of the polyol; and up to about 75% by weight of at least one pigment.

In another aspect, the presently described technology provides an energy curable ink composition comprising a pigment dispersion comprising at least one polyol acrylate, wherein the polyol acrylate is the reaction product of a modified polyol and a (meth)acrylic acid or derivative thereof, wherein the modified polyol is a reaction product of a natural oil or fatty carboxylic acid or derivative thereof reacted with a polyol selected from the group consisting of polyester polyols, polyether polyols, polyester ether polyols and polyalcohols, such that the natural oil or carboxylic acid or derivative thereof is incorporated into the backbone of the polyol; and at least one particulate pigment; a liquid resin; and at least one photoinitiator.

In a further aspect, the presently described technology provides a polyol acrylate prepared from a reaction mixture comprising at least one modified polyol, wherein the modified polyol comprises the reaction product of a polyol selected from the group consisting of polyester polyols, polyether polyols, polyester ether polyols, and polyalcohols, reacted with a natural oil or a fatty carboxylic acid or derivative thereof such that the natural oil or fatty carboxylic acid or derivative thereof is incorporated into the backbone of the polyol; and at least one (meth)acrylic acid or derivative thereof.

In another aspect, the presently described technology provides an energy curable ink comprising at least one polyurethane acrylate, wherein the polyurethane acrylate is the reaction product of a modified polyol with an excess amount of an isocyanate compound and a hydroxyl functioning (meth) acrylate, wherein the modified polyol is a reaction product of a natural oil or fatty carboxylic acid or derivative thereof reacted with a polyol selected from the group consisting of polyether polyols, polyester polyols, polyester ether polyols and polyalcohols, such that the natural oil or fatty carboxylic acid is incorporated into the backbone of the polyol; and up to 75% by weight of at least one pigment.

In another aspect, the presently described technology provides a water-based or solvent-based ink composition comprising at least one modified polyol, wherein the modified polyol is a reaction product of a natural oil or fatty carboxylic acid or derivative thereof reacted with a polyol selected from the group consisting of polyether polyols, polyester polyols, polyester ether polyols, and polyalcohols, such that the natural oil or fatty carboxylic acid is incorporated into the backbone of the polyol; and at least one pigment.

DETAILED DESCRIPTION OF THE INVENTION

Figure 1:
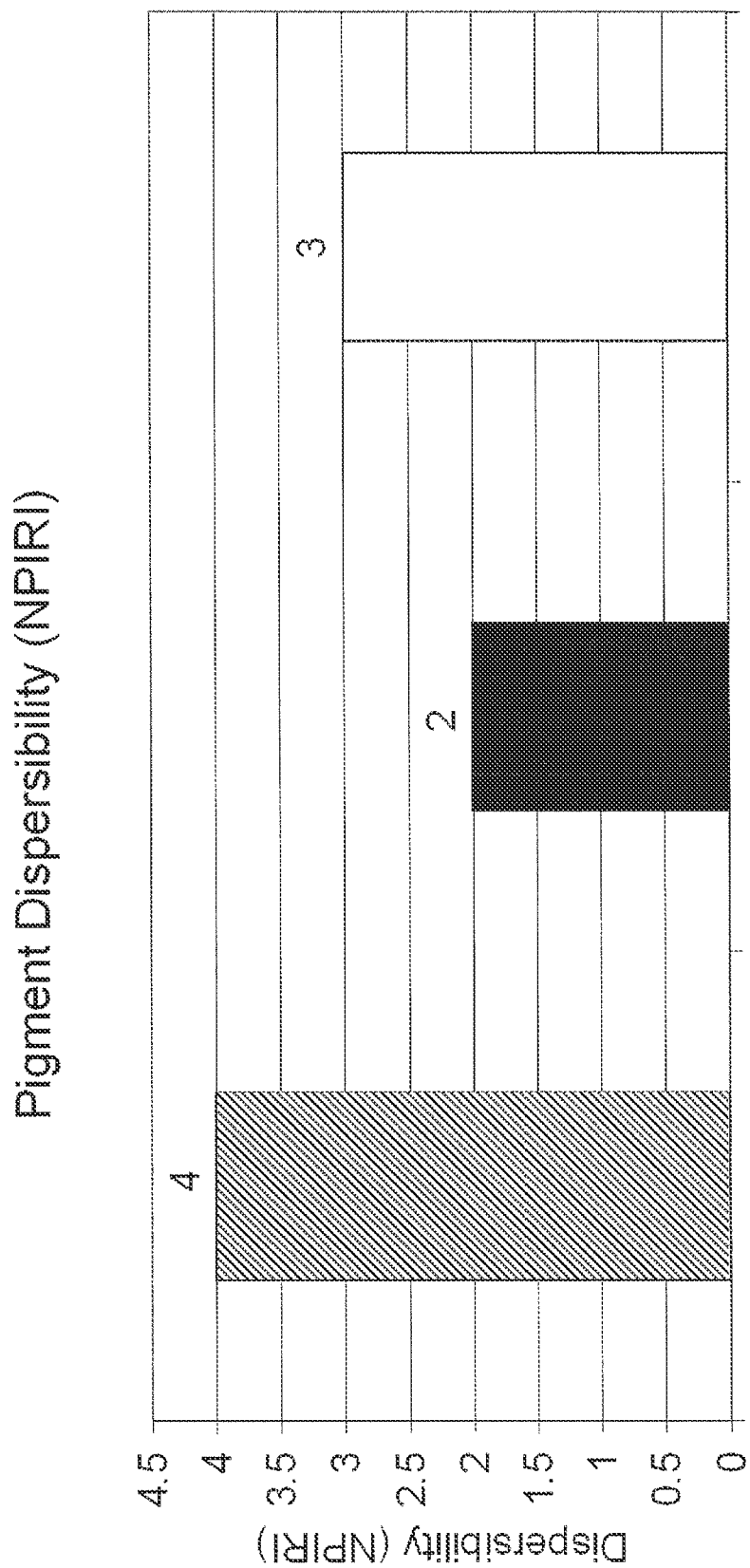
FIG. 1 is a graph comparing the NPIRI numbers for three pigment dispersions.

The presently described technology provides polyol acrylates, pigment dispersions utilizing the polyol acrylates, and energy curable ink compositions that are formulated from the pigment dispersions. Energy curable methods include ultraviolet irradiation (UV), electron beam (EB), thermal cure, and visible light. The pigment dispersions comprise at least one polyol acrylate that incorporates a natural oil or fatty carboxylic acid or derivative thereof into the backbone of the polyol. The pigment dispersions of the present technology are particularly suited for use in printing inks that exhibit one or more advantageous properties including excellent pigment dispersibility and wettability, superior rheological properties, long-term stability, and better color strength even with lower pigment and additive loadings.

As used herein, the term "(meth)acrylate" means methacrylate, acrylate, or a mixture thereof.

As used herein, the term "(meth)acrylic acid" refers to acrylic acid, methacrylic acid, or a mixture thereof.

It has been surprisingly found that certain polyol acrylates made from polyols that incorporate natural oils or fatty carboxylic acids or derivatives thereof into the backbone of the polyol have superior rheological and pigment wetting and dispersibility properties compared to polyether acrylates, epoxy acrylates or polyester polyol acrylates that do not incorporate natural oils or fatty acids. The polyol acrylates of the present technology can be combined with pigments to form pigment dispersions that have lower yield stress, better pigment wettability and pigment dispersibility and better stability compared to pigment dispersions formed with other polyester polyol acrylates or polyether polyol acrylates. Moreover, such improved properties are achieved with lower levels of low surface tension additives or surfactants. The polyol acrylates of the present technology can also be used in other applications such as, for example, overprint varnishes, wood coatings, electronic coatings, adhesive conductive inks, powder coatings, and composite materials. In addition, the polyols incorporating the natural oil or fatty carboxylic acid can be used in water-based or solvent-based ink formulations.

The polyols suitable for use in the presently described technology are prepared by either a one step or a two-step reaction. In a one step reaction, natural oil, (or fatty carboxylic acid), polyalcohol and polyacid are mixed and reacted at same time. In a two-step reaction, the polyol is synthesized from polyacid and polyalcohol first, followed by a further reaction or transesterification with natural oil, or fatty carboxylic acid. This modified polyol is then reacted with a (meth)acrylic acid or its ester derivatives to form the polyol acrylate.

The natural oil which can be used to form the modified polyol is any naturally occurring oil or an oil derived from a natural oil source. Examples of natural oils include soybean oil, castor oil, corn oil, sunflower oil, palm oil, peanut oil, sesame oil, olive oil, grape seed oil, cottonseed oil, cocoa butter, canola oil, almond oil, safflower oil, coconut oil, linseed oil, tallow oil, and derivatives thereof, such as, for example, epoxidized soybean oil. Mixtures of oils may also be used. Soybean oil, castor oil, or epoxidized soybean oil are preferred. The amount of natural oil incorporated into the polyol is from about 5% to about 90% by weight of the polyol, alternatively, about 5% to about 80% by weight, alternatively about 10% to about 40% by weight, alternatively about 15% to about 40% by weight, alternatively about 15% to about 30% by weight, alternatively about 20% to about 35% by weight of the polyol.

A variety of fatty carboxylic acids can also be used to form the modified polyol. Examples of fatty carboxylic acids are substituted or unsubstituted C4 to C22 straight chain fatty acids, C4 to C22 substituted or unsubstituted branched fatty acids, ring-containing fatty acids, dimer acids, derivatives thereof, including, without limitation, fatty acid esters, and mixtures thereof. Examples of suitable fatty acids for use herein include, without limitation, butyric acid, caproic acid, caprylic acid, capric acid, lauric acid, myristic acid, palmitic acid, palmitoleic acid, stearic acid, oleic acid, ricinoleic acid, vaccenic acid, linoleic acid, alpha-linolenic acid, gamma-linolenic acid, arachidic acid, gadoleic acid, arachidonic acid, behenic acid, erucic acid, EPA, DHA, lignoceric acid, and mixtures thereof. The amount of fatty acid incorporated into the polyol is from about 10% to about 90% by weight of the polyol, alternatively about 10% to about 80% by weight, alternatively about 15% to about 40% by weight, alternatively about 20% to about 35% by weight of the polyol.

Polyols

A wide variety of polyols are suitable for reacting with the natural oil, or fatty carboxylic acid or derivative thereof to form the modified polyol. Examples of polyols suitable for use in the present technology are polyester polyols, polyether polyols, polyester ether polyols, and glycols, such as, for example, diethylene glycol, triethylene glycol, pentaerythritol, dipropylene glycol, and glycerin.

Polyester Polyols

The polyester polyols that can be used to make the modified polyol can be obtained by any suitable method. For example the polyester polyol can be derived from reacting one or more polycarboxylic acids with one or more polyhydric alcohols to obtain the polyester polyol. The polycarboxylic acids (also referred to as polyacids) can be, but are not limited to, phthalic acid and/or phthalic anhydride, terephthalic acid, isophthalic acid, maleic acid or anhydride, adipic acid, glutaric acid, azelaic acid, sebacic acid, pyromellitic acid or dianhydride, trimellitic anhydride, cyclohexanedicarboxylic acid, tetrahydrophthalic acid or anhydride, hexahydrophthalic acid or anhydride, dodecanedicarboxylic acid, their suitable derivatives, and mixtures thereof.

Polyalcohols for the presently described technology can be selected from a wide range of multi-alcoholic functioning compounds well-known in the art. Suitable polyalcohols can comprise "n" alcoholic functioning hydroxyl groups in each molecule, where "n" can be in the range of from about 2 to about 50, alternatively from about 2 to about 8, alternatively from about 2 to about 4. Examples of such polyalcohols include, but are not limited to, 1,2-propanediol, 1,3-propanediol, dipropylene glycol, tripropylene glycol, ethylene glycol, diethylene glycol, triethylene glycol, tetraethylene glycol, 1,4-butanediol, neopentyl glycol, 1,6-hexanediol, dihydroxylmethylcyclohexane, 2-butyl-2-ethyl-1,3-propanediol, glycerol, polyethylene glycol, polypropylene glycol, trimethylolpropane, pentaerythritol, their alkoxylated derivatives, and mixtures thereof.

The general structural scheme of one embodiment of a modified polyester polyol is shown below:

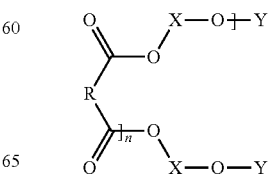

R=C1-C22 substituted or unsubstituted aromatic and/or aliphatic

X=C1-C22 substituted or unsubstituted aromatic and/or aliphatic

Y=H, natural oil, or fatty acid, with at least one Y being natural oil or fatty acid n=1 or greater In some embodiments, it is preferred to have a polyol structure that includes short branching on the polyol backbone. Without being bound by any particular theory, it is believed that such branching helps to increase the pigment dispersibility due to lower surface tension of the polyol acrylate. For example, phthalic anhydride/dipropylene glycol acrylate and phthalic anhydride/tripropylene glycol acrylate have better pigment dispersibility than phthalic anhydride/diethylene glycol acrylate.

Modified polyester polyols can alternatively be formed by reacting a natural oil or fatty acid with a polyhydroxy carboxylic acid, a polyalcohol or mixtures thereof. The polyhydroxycarboxylic acid can be, for example, polycaprolactone, 12-hydroxystearic acid, poly (12-hydroxystearic acid), 12-hydroxy-dodecanoic acid, poly (12-hydroxydodecanoic acid), poly (5-hydroxydodecanoic acid), poly (4-hydroxydodecanoic acid), and mixtures thereof. The polyalcohol can be, for example, diethylene glycol, triethylene glycol, glycerin, dipropylene glycol, tripropylene glycol, polyethylene glycol, polypropylene glycol, pentaerythritol, higher functional polyalcohols having up to 50 functioning hydroxyl groups, and mixtures thereof. The general structure scheme of a modified polyester polyol formed by reacting the natural oil or fatty acid with polyhydroxycarboxylic acid and/or polyalcohol is shown below:

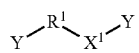

R$^1$=polyhydroxy carboxylic acid and/or hydroxyl carboxylic acid as described above X$^1$=polyalcohol having from 2 to 50 hydroxyl groups Y=H, natural oil, or fatty acid, with at least one Y being natural oil or fatty acid In some embodiments, the modified polyester polyol is formed by reacting the natural oil or fatty acid with only a polyalcohol. The general structural scheme is shown below:

X$^1$=polyalcohol having from 2 to 50 hydroxyl groups

Y=H, natural oil, or fatty acid, with at least one Y being natural oil or fatty acid When the modified polyol is formed by reacting the natural oil or fatty carboxylic acid or derivative with only a polyalcohol, the amount of natural oil or fatty carboxylic acid reacted with the polyalcohol is from about 60% to about 95% by weight of the polyalcohol, alternatively from about 65% to about 85% by weight, alternatively from about 70% to about 90% by weight, alternatively from about 70% to about 80% by weight of the polyalcohol. Incorporating natural oils in these amounts into the polyalcohol results in a lowered viscosity which can lead to improved rheological properties of an ink formulated with the acrylated modified polyol.

Polyester Ether Polyols

Suitable polyester ether polyols for use in preparing the modified polyols are polyester polyols that are further reacted with an alkoxylating agent such as, for example, ethylene oxide, propylene oxide, butylene oxide, or mixtures thereof. The alkoxylating agent is reacted in an amount such that the polyester ether polyol contains from about 1 to about 60 ether moieties. The intermediate polyester polyols can be any of the polyester polyols described previously, for example the polyester polyols formed by reacting one or more polyacids with one or more polyalcohols.

In some embodiments, the polyester polyol is alkoxylated to form the polyester ether polyol, which is then reacted with the natural oil or fatty carboxylic acid to obtain the modified polyester ether polyol. Alternatively, the polyester polyol can be reacted with the natural oil or fatty acid, and the reaction product can then be alkoxylated to form the modified polyester ether polyol. Alkoxylated polyester polyols and processes for preparing them are further described in U.S. Pat. Nos. 6,569,352 and 6,855,844.

The general structural scheme of a modified polyester ether polyol is shown below:

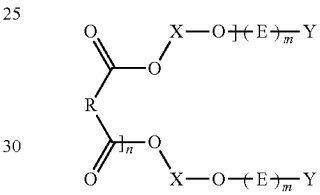

R=C1 to C22 substituted or unsubstituted aromatic and/or aliphatic

X=C1 to C22 substituted or unsubstituted aromatic and/or aliphatic

E=alkoxylate

Y=H, natural oil, or fatty acid, with at least one Y being natural oil or fatty acid m=1 or greater n=1 or greater Polyether Polyols Suitable polyether polyols for use in preparing the modified polyols are polyether polyols formed by reacting a polyalcohol with an alkylene oxide. The polyalcohol can be, for example, ethylene glycol, propylene glycol, glycerine, trimethylolpropane, pentaerythritol, and mixtures thereof. Alkylene oxides useful for preparing the polyether polyols include ethylene oxide, propylene oxide, 1,3-butylene oxide, epichlorohydrin, and mixtures thereof. The polyalcohol can be reacted with the alkylene oxide to form the polyether polyol, which is then reacted with the natural oil or fatty carboxylic acid. Alternatively, the polyalcohol can be reacted with the natural oil followed by reaction with the alkylene oxide.

Chain Extended Polyols

It is contemplated that any of the above-described polyols can be end-capped with different molecules or chain extenders, either before or after reacting the polyol with natural oil or fatty carboxylic acids. Chain-extenders that can be reacted with the polyol include, but are not limited to, lactide, δ-valerolactone, ε-caprolactone, and alkyl substituted ε-caprolactone, including 3-methyl, 5-methyl, 4-methyl, 6-methyl, 7-methyl, 5-tertbutyl, 4,6,6-trimethyl, and 4,4,6-trimethyl ε-caprolactone. End-capping molecules that can be reacted with the polyol include, but are not limited to, linear or branched structures having from 1 to 25 carbon atoms, ethylene carbonate, propylene carbonate, and isocyanates, including TDI, TSI, MDI and IPDI.

The modified polyols prepared by any of the above methods have an Iodine value in the range of 0 to about 175, alternatively about 20 to about 159, alternatively about 50 to about 140. The modified polyols can have a functionality of 1 up to about 8.

Polyol Acrylates

The modified polyol acrylates of the present technology are obtained from the reaction of any of the modified polyols described above with a (meth)acrylic acid or derivative thereof. Useful (meth)acrylic acids or derivatives have the following structural formula:

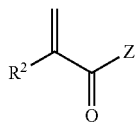

wherein $R^2$ is hydrogen, methyl or ethyl, aromatic or a C3 to C20 straight or branched alkyl, and Z is chloride, bromide, hydroxyl, ester or a mixture thereof.

To prepare the modified polyol acrylates, the modified polyol and the (meth)acrylic acid or derivative are charged to a reactor along with p-toluenesulfonic acid, 2,5-di-tert-butyl-hydroquinone, and toluene as a solvent. The amount of (meth) acrylic acid charged to the reactor is from about 1 moles to about 5 moles per mole of modified polyol, preferably about 2.1 moles (meth)acrylic acid or derivative per mole of modified polyol. The reactants are heated to a temperature of about 125° C., followed by vacuum stripping of the solvent and neutralization with, for example, glycidyl methacrylate. In a contemplated embodiment, the (meth)acrylic acid is present in such an amount, and the reaction is carried out to such a degree that the conversion of polyol to polyol acrylate is as high as 90% or greater.

The resulting modified polyol acrylates have a surface tension of less than 40 dynes/cm, alternatively less than 38 dynes/cm, alternatively less than 36 dynes/cm. High surface tension has a negative impact on pigment wetting. Typical commercial polyol acrylates have surface tensions as high as 40 to 45 dynes/cm. The modified polyol acrylates of the present technology, however, have surface tensions lower than about 40 dynes/cm. The lower the surface tension an acrylate resin has, the better the pigment wetting, the better the pigment dispersibility and the greater the pigment stability that can be achieved, resulting in stronger color for the final ink composition. The modified polyol acrylates of the present technology have lower surface tensions than commercially available polyol acrylates, or polyether polyol acrylates, and have improved pigment wetting, dispersibility and stability compared to commercially available polyol acrylates that do not incorporate natural oils or fatty acids into the polyol structure.

The resulting modified polyol acrylates also have a high molecular weight, preferably in the range of about 100 to about 50,000 Daltons, alternatively about 200 to about 10,000 Daltons.

Polyurethane Acrylates

It is contemplated that any of the modified polyols described above can be reacted with an isocyanate compound and a hydroxyl-containing (meth)acrylate compound to prepare modified polyurethane acrylates. The modified polyurethane acrylates are prepared by, for example, reacting the modified polyol with an excess amount of an isocyanate to make an isocyanate-terminated prepolymer, which can then be reacted with a hydroxyl functioning (meth)acrylate. Alternatively, a hydroxyl functioning (meth)acrylate can be reacted with an excess amount of isocyanate to form a prepolymer, and then the modified polyol can be reacted with the prepolymer to form the polyurethane acrylate.

Pigment Dispersions

The modified polyol acrylates of the present technology are incorporated into pigment dispersions that are useful for formulating energy curable printing ink compositions. The pigment dispersions are prepared by mixing from about 10% to about 95% by weight of the presently described modified polyol acrylates, alternatively about 10% to about 70% by weight, alternatively about 20% to about 60% by weight, alternatively about 30% to 50% by weight, with from about 10% to about 75% by weight of a suitable pigment, alternatively about 10% to about 50% by weight, alternatively about 15% to about 45% by weight, alternatively, about 15% to about 40% by weight of a suitable pigment. Suitable pigments can be organic or inorganic pigments. Inorganic pigments include carbon black, Milori blue $(Fe(NH_4)Fe(CN)_6 \cdot xH2O)$, Titanium oxide, chrome yellow $(PbCrO_4/PbSO_4)$, iron oxide, and molybdate orange $((PbCrO_4/PbMoO_4).)$. Organic pigments include azo red, naphthol red, diarylide yellow, diarylide orange, phthalo blue, phthalo green, quinacridones, diketopyrrolo-pyrrole, isoindolinones, and perlenes. A particularly suitable pigment is SUNFAST® blue 15:4, a phthalo blue pigment produced by Sun Chemical (Cincinnati, Ohio).

Additional components can also be included in the pigment dispersions. For example, the pigment dispersions can comprise additional monomers and can include additives, such as pigment dispersion agents. The additional monomers are used primarily as diluting agents to control the viscosity of the pigment dispersion. One or more additional monomers that can be incorporated into the pigment dispersion include, without limitation mono-, di, tri, tetracrylate and methacrylates, such as 2,2-bis[4-3(-(meth)acryloxy-2-hydroxypropoxy)phenyl]-propane, Bisphenol di(meth)acrylate, neopentylglycol di(meth)acrylate, decanediol-1,10-di(meth) acrylate, dodecanediol-1,12-di(meth)acrylate, 1,4,-butanediol di(meth)acrylate, ethyleneglycol di(meth) acrylate, diethyleneglycol di(meth)acrylate, triethyleneglycol di(meth)acrylate, tetraethyleneglycol di(meth)acrylate, polyethyleneglycol di(meth)acrylate, propyleneglycol di(meth)acrylate, dipropyleneglycol di(meth) acrylate, tripropylene di(meth)acrylate, tetrapropyleneglycol di(meth)acrylate, polypropyleneglycol di(meth)acrylate, hexamethyleneglycol di(meth)acrylate, hydroxyethyl (meth) acrylate, di-2 (meth)acryloxyethyl-2,2,4-trimethylhexamethylene dicarbamate, and tetrahydrofurfryl(meth)acrylate. Such additional monomers are present in the pigment dispersion in a total amount of about 1% to about 40% by weight of the dispersion, alternatively about 2% to about 20% by weight.

Pigment dispersion agents contemplated for use in the pigment dispersion are organic compounds that can form a bridge between the pigment powder and the resin matrix. Such pigment dispersion agents act in a way similar to a surfactant and improve the pigment dispersion in one or more of the following ways:
 1. Increasing pigment concentration
 2. Improve pigment wetting
 3. Higher gloss and strength
 4. Improve rheology In general, anionic, cationic and non-ionic dispersion agents are common dispersion agents. Cationic dispersion agents include lauryl-pyridium chloride, cetyldimethyl amine acetate, and alkyldimethylbenzylammonium chloride in which the alkyl group has from 8 to 18 carbon atoms. Anionic dispersion agents include sodium lauryl sulfate, alkylaryl sulfate such as sodium or potassium isopropylbenzene sulfate, or isopropyl naphthalene sulfonate, alkali metal higher alkyl sulfosuccinates, such as sodium octyl sulfosuccinate, sodium N-methyl-N-palmitoyltaurate, sodium oley isothionate, and alkali metal salts of alkylarylpolyethoxyethanol sulfates or sulfonates, such as sodium tert-octylphenoxy polyethoxyethyl sulfate having 1 to 5 oxyethylene units. Non-ionic dispersion agents include alkylphenoxypolyethoxyethanols having alkyl groups of from about 7 to 18 carbon atoms and from about 6 to about 60 oxyethylene units, such as heptylphenoxypolyethoxyethanols, methyloctylphenoxypolyethoxyethanols, polyethoxyethanol derivatives of methylene-linked alkyl phenols; sulfur-containing agents such as those made by condensing from about 6 to 60 moles of ethylene oxide with nonyl mercaptan, dodecyl mercaptan or with alkylthiophenols wherein the alkyl groups contain from 6 to 16 carbon atoms; ethylene oxide derivatives of long-chained carboxylic acid, such as lauric acid, myristic acid, and palmitic acid, sorbitan monostearate containing from 6 to 60 oxyethylene condensates of long chain or branched chain amines, such as dodecyl amine, hexadecyl amine, and octadecyl amine, containing from 6 to 60 oxyethylene units; block copolymers of ethylene oxide sections combined with one or more hydrophobic propylene oxide sections. A suitable pigment dispersion agent is Solsperse® 39000, a nonionic dispersion agent available from Lubrizol Corporation, Cleveland, Ohio. Pigment dispersion agents are typically present in the pigment dispersion in an amount of about 0.005% to about 10% by weight of the pigment dispersion, alternatively 0.5% to about 5% by weight.

One advantage of the modified polyol acrylates of the present technology is that lesser amounts of pigments and additives can be incorporated into the pigment dispersion yet the performance properties are equal or better than pigment dispersions prepared with commercially available polyol acrylates and higher amounts of pigments and additives. Such an advantage results in a more economical pigment dispersion because lesser amounts of pigments and additives can be utilized without sacrificing performance. Another advantage of the modified polyol acrylates of the present technology is that, if desired, additional pigment can be added to the pigment dispersion in order to obtain a stronger colored pigment dispersion. With a stronger colored pigment dispersion, less pigment dispersion is required in the final ink formulation. Such an advantage results in a more economical ink formulation, stronger color and improved performance properties.

In general, the pigment dispersions are prepared by mixing the modified polyol acrylate and other contemplated monomers and additives with the pigment, which is typically in a powdered form. Three-roll milling after mixing thoroughly distributes and wets the pigment powder. The resulting paste-like pigment dispersion has a lower yield stress and better pigment dispersibility compared to pigment dispersions prepared with other polyol acrylates.

Energy Curable Ink Compositions

The pigment dispersions of the present technology are formulated into energy curable ink compositions by mixing from about 15% to about 95% by weight, alternatively about 15% to about 80% by weight, alternatively about 20% to about 50% by weight of a pigment dispersion with a diluent, which is also known in the art as a letdown vehicle. The letdown vehicle is typically a low viscosity resin or resin mixture that is compatible with the pigment dispersion, although for water-based inks the letdown vehicle can be water. Acrylate resins having a functionality of 2 or higher are desirable for use as the letdown vehicle because such higher functional acrylates improve the curability of the ink composition compared to acrylate resins having a single functionality. Contemplated letdown vehicle resins for use herein include, but are not limited to, mono-, di, tri, tetra, penta, hexacrylates and methacrylates, such as 2,2-bis[4-3(-(meth)acryloxy-2-hydroxypropoxy)phenyl]-propane, Bisphenol di(meth)acrylate, neopentylglycol di(meth)acrylate, decanediol-1,10-di(meth)acrylate, dodecanediol-1,12-di(meth)acrylate, 1,4,-butanediol di(meth)acrylate, ethyleneglycol di(meth)acrylate, diethyleneglycol di(meth)acrylate, triethyleneglycol di(meth)acrylate, tetraethyleneglycol di(meth)acrylate, polyethyleneglycol di(meth)acrylate, propyleneglycol di(meth)acrylate, dipropyleneglycol di(meth)acrylate, tripropylene di(meth)acrylate, tetrapropyleneglycol di(meth)acrylate, polypropyleneglycol di(meth)acrylate, hexamethyleneglycol di(meth)acrylate, hydroxyethyl (meth)acrylate, di-2 (meth)acryloxyethyl-2,2,4-trimethylhexamethylene dicarbamate and tetrahydrofurfryl(meth)acrylate. Preferably the letdown vehicle resin comprises a modified polyol acrylate of the present technology. In a particularly preferred embodiment, the letdown vehicle used in formulating the energy curable ink is the same modified polyol acrylate that is used to prepare the pigment dispersion used in the energy curable ink formulation. Combinations of resins can be used as the letdown vehicle. For example, in one contemplated embodiment the modified polyol acrylate comprises from about 5% to about 95% by weight of the letdown vehicle, alternatively from about 5% to about 75% by weight, alternatively from about 10% to about 60% by weight, alternatively about 15% to about 50% by weight. It is also contemplated, although not preferred, that energy curable ink compositions can be prepared by utilizing commercially available polyol acrylates to prepare the pigment dispersion, and utilizing the modified polyol acrylates of the present technology as the letdown vehicle. The letdown vehicle typically comprises from about 20% to about 80% by weight of the energy curable ink formulation, alternatively about 30% to about 70% by weight.

The energy curable ink formulation can optionally further comprise additional components, such as surfactants and waxes, to enhance a particular property. For example, surfactants can be used to improve the performance of the ink, including wettability, dispersibility, stability, flow, leveling, slip and abrasion resistance. Examples of suitable surfactants for use in the energy curable ink formulation include acrylate-functional surfactants such as the TEGO® Rad series of surfactants available from Evonik, (Hopewell, Va.). One or more surfactants can be incorporated into the energy curable ink composition. The total amount of surfactant incorporated into the energy curable ink formulation can be about 0.1% to about 4% by weight of the ink composition. One or more waxes can be added to the energy curable ink composition to improve slip and transit abrasion resistance, while maintaining gloss and clarity. Suitable waxes for use in the energy curable ink formulation include EVERGLIDE® UV 691, and ULTRA-GLIDE® UV 704, available from Shamrock (Newark, N.J.). If waxes are included in the ink formulation, they are present in a total amount of about 0.2% to about 10% by weight of the ink composition, alternatively, about 0.4% to about 5% by weight.

The energy curable ink formulation optionally includes one or more photoinitiators in an amount of about 1% to about 14% by weight of the ink composition. Suitable photoinitiators include but are not limited to, ESACURE® KTO 46, available from Sartomer (Exton, Pa.), ADDITOL® LX, ADDITOL® DX, both available from Cytec (Smyrna, Ga.), and IRGACURE® TPO, IRGACURE® 651, IRGACURE® 819 and DAROCURE®, all available from CIBA Specialty Chemicals (Tarrytown, N.Y.). Photoinitiators may not be necessary if Electron Beam energy is used to cure the ink.

The energy curable ink compositions are prepared by combining the pigment dispersion, the letdown vehicle, and any additional components, such as surfactants, waxes and the photoinitiators and mixing the components in a high shear mixer for a sufficient time to evenly mix and distribute the pigment in the ink composition.

Alternatively, in some embodiments, the energy curable ink compositions are prepared in one step, without first preparing a pigment dispersion. In such embodiments, the pigment is milled and blended with at least one modified polyol acrylate of the present technology, at least one additional resin, and optionally additional additives, and at least one photoinitiator, to form the final ink composition. The final ink composition comprises from about 1% to about 80%, alternatively about 10% to about 60%, alternatively 15% to about 50% by weight modified polyol acrylate. The additional resin in the ink composition is selected from the group consisting of polyol acrylates, epoxy acrylates, polyurethane acrylates, acrylic acrylates, silicone acrylates, and mixtures thereof, and comprises from about 20% to about 70%, alternatively about 30% to about 60%, alternatively about 35% to about 55% by weight of the ink composition. The pigment component comprises from about 5% to about 50%, alternatively about 10% to about 40%, alternatively about 15% to about 30% by weight of the ink composition. The photoinitiator comprises from about 2% to about 20%, alternatively about 5% to about 15%, alternatively about 6% to about 8% by weight of the ink composition.

The energy curable ink compositions of the present technology exhibit improved physical properties compared to commercially available polyester polyol acrylate and polyether polyol acrylate energy curable ink compositions. For example, the energy curable ink compositions of the present technology demonstrate less pseudoplasticity and more Newtonian fluid behavior. An ideal ink is a Newtonian fluid. This means that the viscosity of the fluid does not change with shear rate. In other words, the viscosity stays fairly constant regardless of shear rate. Pseudoplasticity is not a desirable property in an ink composition and it is therefore preferred to try to minimize pseudoplasticity. The energy curable ink compositions of the present technology accomplish both Newtonian fluid behavior and reduced pseudoplastic behavior. In addition, the energy curable ink compositions of the present technology demonstrate improved ink stability, stronger color, good adhesion to substrates, good solvent resistance, and good scratch resistance.

The presently described technology and its advantages will be better understood by reference to the following examples. These examples are provided to describe specific embodiments of the present technology. By providing these specific examples, the inventors do not limit the scope or spirit of the present technology. It will be understood by those skilled in the art that the full scope of the presently described technology encompasses the subject matter of the claims appended to this specification.

Polyols used in the examples are either commercially available materials or synthesized as shown in the examples.

The following is a general description of the testing methods used in the examples.

Acid Value Determination

About 3.00 g of a sample is accurately weighed into a 250 mL titration flask, 50 mL of acetone is added to the flask, the sample is mixed to let the sample dissolve completely, 2 drops of phenolphthalein indicator are added, and the sample is titrated with 0.1000 N standardized KOH solution to a light pink end point. The acid value (AV) is calculated as:

$$AV(mg/KOH/g)=(\text{titrant volume(mL)})(5.61)/\text{sample weight(g)}$$

Hydroxyl Value Determination

An appropriate sample size is accurately weighed and added into a 250 mL flask. 25 mL standardized acetylating reagent is added into the flask by using a pipette. Boiling stones are added, and condensers are attached to the flask, which is then placed on a hot plate. The sample solution is heated to reflux for one hour, and then cooled to room temperature. The condensers are rinsed with about 50-55 mL distilled water. The rinsing water is collected into the flask. Two drops of phenolphthalein solution are added to the sample, which is then titrated with 1.000 N KOH solution to a bright red end point. The volume of the titrant use is recorded. A blank titration is run exactly the same way as for the sample except that no sample is used. The hydroxyl number (OHV) is calculated according to the following equation:

$$OHV(\text{mg KOH/g})=(A-B)(1,000N\ KOH)(56.1)/\text{sample weight(g)}$$

Where A=mL of titrant used for blank, B=mL of titrant used for sample.

MEK Double Rub Method

MEK stands for methyl ethyl ketone. A simple method to evaluate solvent resistance is the MEK double rub method. This measurement is carried out using the ASTM D5402 procedure. If a coating breaks down or wear is visible, such change is recorded. Otherwise, the following rating procedure will grade the MEK resistance. A "5" indicates no visible change in every aspect detected by an unaided naked eye, and a "1" is given to a coating that develops heavy haze, cloudiness or solvent mark after a MEK double cheesecloth pad rubbing. "2," "3" and "4" are rated against these two extremes. If 3 samples are run, each tested rate will be added together.

Gloss Measurement

ASTM D523 is followed to test the gloss of a cured thin ink press. A BYK-Gardner micro-TRI-gloss μ gloss meter is used. Three readings at 60° angle are taken at three different areas of an ink press on the black part of a Leneta Chart along the drawdown direction and all readings are averaged to give the gloss level of sample.

Rheology Study

Terminology:

G' is called storage modulus, or elastic component.

G" is called loss modulus, or viscous component.

G"/G'=Tan δ. A Newtonian fluid has 90 degree for δ value and |n*| is complex viscosity.

All rheological properties are carried out on an AR2000 rheometer with 40 mm 2 degree cone plate from TA instrument. An oscillation stress sweep is run under 1 HZ frequency and at 25° C. without pre-shear. Yield stress is determined by the peak point of elasticity in stress sweep. A frequency sweep is run under 500 Pa stress at 25° C. Shear ramp and flow chart are obtained by varying shear rate or rotation speed characterized by RPM. The shortness index is calculated by the ratio of low shear viscosity versus high shear viscosity.

Dispersibility

A gardner grind gauge Model 427 is used to test pigment dispersiblity based on NPIRI (National Printing Ink Research Institute) number. The method is conducted in accordance with ASTM D1316-06. The lower NPIRI number represents better dispersion.

Surface Tension

Surfactant tension is taken on a KRÜSS K12 tensiometer using plate method. The immersion depth is 2 mm. Data acquisition time and detection speed are 300 s and 6 mm/min, respectively. Ten data points are collected and the last 5 data points are averaged to give surface tension.

Color Density

Color density is tested by using TECHKON RS 400 Scan-Densitometer. 0/45° optics to DIN 5033 is taken as measurement geometry. The scan speed is 100 mm/s and the density standard is DIN 16536.

The following abbreviations are used in the examples.
AA Adipic acid
AV Acid value
CO Castor oil
DEG Diethylene glycol
DPTT Dipentaerythritol
DPG Dipropylene glycol
ESBO Epoxidized soybean oil
HD Hexanediol
NPG Neopentyl glycol
OHV Hydroxyl value
PA Phthalic anhydride
PEG-400 Polyethylene glycol
PGC Polyglycerol
SBO Soybean oil
TEG Triethylene glycol
TMP Trimethylolpropane
TBT Titanium tetrabutoxide
TPG Tripropylene glycol
TPA Terephthalic acid The following polyols utilized in the examples are commercially available and are characterized in Table 1:

TABLE 1

| Polyols | OHV | AV | Viscosity (cp) 25° C. |
|---|---|---|---|
| Polyol-1 | 315 | 2.45 | 2,945 |
| Polyol-2 | 394 | 0.56 | 922 |
| Polyol-3 | 233 | 0.93 | 19,455 |
| Polyol-4 | 190 | 0.67 | 26,520 |
| Polyol-5 | 232 | 0.68 | 3033 |
| Polyol-6 | 183 | 1.00 | 3100 |
| Polyol-7 | 293.9 | 0.30 | 94 |

Polyols 1-6 are based on phthalic anhydride/diethylene glycol (PA/DEG); Polyol-7 is polyethylene glycol (PEG-400).

Polyol Synthesis

Examples 1-8

The following Examples 1-8 illustrate the synthesis of polyols used in some of the examples.

Example 1

Synthesis of PA/DEG/NPG Polyester Polyol

PA (610 g), DEG (421 g) and NPG (421 g) are charged into a 2 L flask, stirred and heated up to 130° C. TBT catalyst (0.44 g, 300 ppm) is added into the solution. The temperature is maintained at 220-225° C. for twelve hours until AV is less than 1.0 mg KOH/g. The final OHV is 300 mg KOH/g, AV is 0.91 mg KOH/g and viscosity is 27,400 cP at 25° C.

Example 2

Synthesis of PA/TPA/DEG/PGC Polyester Polyol

PA (200 g), TPA (230 g), DEG (495 g) and PGC (75 g) are stirred and heated up to 200-210° C. using 300 ppm of TBT catalyst. The mixture is stirred for 16 h under a nitrogen atmosphere to give a light brown liquid. The final OHV is 313 mg KOH/g, AV is 2.0 mg KOH/g, viscosity is 10,900 cP at 25° C.

Example 3

Synthesis of PA/DPG Polyester Polyol

PA (335 g) and DPG (665 g) are stirred and heated up to 130° C. following by adding TBT catalyst (0.30 g, 300 ppm). The temperature is raised to 225° C. and maintained for eighteen hours. The reaction is stopped when the AV is below 3.0 mg KOH/g. The final OHV is 319 mg KOH/g, AV is 2.11 mg KOH/g and viscosity is 3,260 cP at 25° C.

Example 4

Synthesis of PA/AA/DEG/DPTT Polyester Polyol

PA (857.1 g), AA (430.1 g), DEG (1144 g), DPTT (179.7 g) are charged into a flask equipped with a stirrer, thermocouple, nitrogen sparge, distillation head and heating mantel. The contents are heated to 215-225° C. under nitrogen sparge. When the temperature reaches 165° C., TBT (0.78 g) is charged and the reaction is allowed to continue until the acid value is less than 2 mg KOH/g and the hydroxyl value is between 315-330 mg KOH/g. An additional diethylene glycol (31.8) is added when the acid value reaches a value of less than 2 mg KOH/g. The final OHV is 193.5 mg KOH/g, AV is 1.43 mg KOH/g and viscosity is 60,300 cP at 25° C.

Example 5

Synthesis of PA/TPG Polyester Polyol

PA (335 g) and TPG (1300 g) are stirred and heated up to 130° C. following by adding TBT catalyst (0.30 g, 300 ppm). The temperature is raised to 225° C. and maintained for eighteen hours. The reaction is stopped until the AV is below 2.0 mg KOH/g. The final OHV is 326 mg/KOH/g, AV is 0.7 mg KOH/g, and viscosity is 550 cP at 25° C.

Example 6

Synthesis of PA/TEG Polyester Polyol

PA (766.8 g) and TEG (1833.2 g) are charged into a flask equipped with a stirrer, thermocouple, nitrogen purge, distillation head and heating mantel. The contents are heated to 210-220° C. under nitrogen purge. When the temperature reaches 125° C., TBT catalyst is charged and the reaction is allowed to continue until the acid value is less than 1 mg KOH/g and the hydroxyl value is between 305-315 mg KOH/g. The final OHV 309.1 mg KOH/g, AV is 0.48 mg KOH/g, viscosity is 740 cP at 25° C.

Example 7

Synthesis of Adipate Diethylene Glycol Polyester Polyol

AA (425 g) and DEG (575 g) are charged into 2 a L flask equipped with a thermal couple, nitrogen inlet, a condenser and a mechanical stirrer. 0.54 g of TBT catalyst is added to the solution. The mixture was stirred at 200° C. under nitrogen purge. When the AV drops below 1.0 mg KOH/g, the reaction is stopped. The final OHV is 324 mg KOH/g. AV is 0.58 mg KOH/g and viscosity is 264 cP 25° C.

Example 8

Synthesis of DEG/FA Polyester Polyol

A fatty acid, EMERY® 536 fatty acid, available from Cognis (Cincinnati, Ohio), has the following composition and properties:

| Acid value mg KOH/g | 206 | |
|---|---|---|
| Iodine value | 50 | |
| Composition | Myristic acid | 3% |
| | Palmitic acid | 27% |
| | Palmitoleic acid | 4% |
| | Margaric acid | 1% |
| | Margaric oleic acid | 0.5% |
| | Stearic acid | 19% |
| | Oleic acid | 39% |
| | Linoleic acid | 3.7% |
| | Myristoleic acid | 0.3% |

700 g of this fatty acid, and DEG (250 g) are stirred and heated up to 130° C. followed by adding TBT catalyst (0.057 g, 60 ppm). The temperature is raised to 200° C. and maintained for three hours. The final OHV is 196.8 mg KOH/g, AV is 89.1 mg KOH/g.

Natural Oil Transesterification

The following General Procedure is used to prepare the modified polyols used in the Examples, unless expressly recited otherwise. The General Procedure results in a modified polyol which has the natural oil transesterified into the backbone of the polyol.

General Procedure

Polyol and natural oil are charged in a 3 L 4-neck reactor with a heating mantle, a thermometer, a $N_2$ purge and a mechanical stirrer and a 12 inch packed column. The temperature is raised to 200-210° C. with continued $N_2$ purge. After 2 h reaction, an approximately 2 g sample is withdrawn from the reactor and put into a glass vial cooling to room temperature. If this sample turns hazy when cooled to room temperature, the reaction will be continued until a clear product is obtained after cooling.

Examples 9-28

The general procedure for natural oil transesterification was utilized to prepare modified polyols in accordance with the present technology. The polyol and the type and amount of natural oil used for each example are identified in Table 2 below, along with the characteristics of each of the polyols modified with the natural oils.

TABLE 2

Natural oil transesterification

| Example | Polyol | Oils | OHV | AV | Viscosity (cP at 25° C.) |
|---|---|---|---|---|---|
| 9 | Polyol-1 | 5% SBO | 306 | 1.50 | 1,925 |
| 10 | Polyol-1 | 10% SBO | 290 | 0.52 | 1,740 |
| 11 | Polyol-1 | 15% SBO | 278 | 1.19 | 1,435 |
| 12 | Polyol-1 | 20% SBO | 261 | 0.35 | 1,205 |
| 13 | Polyol-1 | 20% CO | 286 | 0.54 | 1,675 |
| 14 | Polyol-1 | 20% ESBO | 255 | 0.37 | 965 |
| 15 | Example 6 | 20% SBO | 249 | 0.41 | 505 |
| 16 | DEG | 72.9 5 SBO | 271 | 0.23 | 61.5 |
| 17 | Polyol-7 | 20% SBO | 215 | 0.23 | 90 |
| 18 | Example 7 | 20% SBO | 271 | 0.32 | 197 |
| 19 | Polyol-1 | 5.1% SBO | 292 | 1.58 | 1,955 |
| 20 | Polyol-1 | 13.75% SBO | 270 | 0.94 | 1,500 |
| 21 | Polyol-1 | 22.50% SBO | 244 | 1.93 | 1,118 |
| 22 | Polyol-1 | 31.25% SBO | 211 | 2.21 | 790 |
| 23 | Polyol-1 | 40% SBO | 213 | 2.48 | 828 |
| 24 | DEG | 95% SBO | 68 | 0.22 | 57 |
| 25 | DEG | 86.25% SBO | 148 | 0.45 | 51 |
| 26 | DEG | 77.50% SBO | 240 | 0.50 | 54 |
| 27 | DEG | 68.75% SBO | 311 | 0.40 | 52 |
| 28 | DEG | 60% SBO | 383 | 0.45 | 53 |

Example 29

Polyol Esterification with Fatty Acid

Polyol-1 (250 g) and EMERY® 536 fatty acid (94 g) are charged in a 3 L 4-neck reactor with a heating mantle, a thermometer, a $N_2$ purge and a mechanical stirrer and a 12 inch packed column. The temperature is raised to 200-210° C. with continued $N_2$ purge. After 2 h reaction, an approximately 2 g sample is withdrawn from the reactor and put into a glass vial cooling to room temperature. The final OHV is 194.4 mg KOH/g, AV is 0.55 mg KOH/g, and viscosity is 1,260 cP at 25° C.

Example 30

Synthesis of PA/DEG/DPTT/CO Polyester Polyol

PA (622.1 g), DEG (655.1 g), DPTT (174.6 g) are charged into a flask equipped with a stirrer, thermocouple, nitrogen sparge, distillation head and heating mantel. The contents are heated under nitrogen sparge. When the temperature reaches 125° C., TBT (0.95 g) is charged, and the temperature is raised to 215°-225° C. The reaction is allowed to continue until the acid value is less than 2 mg KOH/g and the hydroxyl value is between 315-330 mg KOH/g. An additional DEG (61.1 g) is added when the acid value reaches a value of less than 2 mg KOH/g. Castor oil (285.5 g) is added to the flask and the mixture is heated to 225° C. and reacts until the polyol is clear at room temperature. The final polyol has an acid value of 1.17 mg KOH/g, hydroxyl value of 302.3 mg KOH/g, water content of 0.02% and a viscosity of 20,300 cP at 25° C.

Acrylation of Polyester Polyol

The following General Procedure is used to prepare polyol acrylates from the polyols or modified polyols described above.

General Procedure

Polyol, acrylic acid, p-toluenesulfonic acid monohydrate, di-tert-butylhydroquinone and solvent-toluene are charged into a 500 mL 4-neck reactor which is affixed with a thermocouple, a mechanical stirrer, an air purge, a heating mantle and an azeotropic distillation condenser. Before heating up the reaction solution, a strong air purge is applied for 10 minutes with vigorous stifling. Then air purge is reduced to a medium speed through the reaction processes including vacuum distillation and the final neutralization with glycidyl methacrylate. The mixture is first heated up to 114° C. for one hour following 4° C. increases every hour until reaching a range of 125-128° C. The esterification reaction is stopped if no more water could be collected in the graduation cylindrical funnel. The temperature is lowered to 110° C. and then the reaction mixture is vacuum distilled under 20-26 inch mercury vacuum for 2-3 hours. If more than 3 h distillation is needed, an extra amount of inhibitor (di-tert-butylhydroquinone) is added into the reactor. In general, 500 to 1000 ppm level is recommended. However, if more inhibitor is added, a darker color product will be obtained. Based on acid value of the product, a calculated amount of glycidyl methacrylate is charged into the reactor which is heated at 110° C. for 2 hours. The material is cooled to room temperature, poured into an amber jar.

For each of the above polyols including synthesized and commercial materials, acrylated polyol is expressed as the original polyol name added with a capital "A." For instance, Polyol-1 will be Polyol-1A and Example 1 will become Example 1A. This nomenclature is used in the following examples.

Pigment Dispersions with 45% Pigment

Examples 31-35 (Comparative)

Different Glycols in Polyol Backbone, No Natural Oil

The following Examples 31-35 illustrate the effects of adding a branching structure into the polyol acrylate on the rheological and dispersibility properties of the acrylate. Example 31 is an acrylate prepared from the Example 1 polyester polyol (PA/DEG/NPG polyester polyol), Example 32 is an acrylate prepared from the Example 2 polyester polyol (PA/TPA/DEG/PGC polyester polyol), Example 33 is an acrylate prepared from the Example 3 polyester polyol (PA/DPG polyester polyol), Example 34 is an acrylate prepared from the Example 4 polyester polyol (PA/AA/DEG/DPTT polyester polyol), and Example 35 is an acrylate prepared from the Example 5 polyester polyol (PA/TPG polyester polyol).

Each of the acrylates were formulated into a pigment dispersion comprising 45% by weight SUNFAST® Blue 15:4 pigment and 1.1% by weight SOLSPERSE® 39000 dispersing aid. The pigment dispersions were evaluated for surface tension, yield stress, and pigment dispersibility. The results are shown in Table 3.

TABLE 3

Pigment dispersion formulated with branched polyester polyol acrylates

| Dispersions | Acrylates | Acrylate surface tension (dynes/cm) | Yield Stress (Pa) | Dispersibility (NPIRI) |
|---|---|---|---|---|
| Example 31 | Example 1A | 37.8 | 63.0 | 7.0 |
| Example 32 | Example 2A | 37.7 | 125.6 | 8.0 |
| Example 33 | Example 3A | 37.6 | 500.0 | 5.0 |
| Example 34 | Example 4A | 36.0 | 629.5 | 5.0 |
| Example 35 | Example 5A | 34.3 | 428.8 | 3.0 |

Dispersion: 1.1% SOLSPERSE ®39000, 45% SUNFAST ® Blue 15:4 pigment

The results in Table 3 for Examples 31-35 illustrate that just adding a branching structure into the polyol by using different glycols to make the polyols changes the surface tension of the polyester polyol, resulting in a better pigment dispersibility. However, without any natural oil in the polyol acrylates, the yield stress of the branched polyester polyols is relatively high. Lower yield stresses, such as those that can be achieved when a natural oil is incorporated into the polyol, are more desirable. In general, it is desirable for the pigment dispersion to have a yield stress of less than 650 Pa, alternatively less than about 400 Pa, alternatively less than about 200 Pa, alternatively less than about 50 Pa.

Examples 36-40

Soybean Oil Transesterification

SBO has a surface tension of approximately 33 dynes/cm. The following examples illustrate that transesterifying SBO into the backbone of the polyol lowers the surface tension of the acrylated polyester polyols. The higher the percentage of SBO transesterified into the backbone of the polyol, the lower the surface tension of the acrylated polyester polyols. As can be seen from the results shown in Table 4, a 10-20% SBO addition dramatically lowered the surface tension of Polyol-1A from 42 dynes/cm to less than 37 dynes/cm. The incorporation of the SBO into the polyol also lowered the yield stress and resulted in greatly improved dispersiblity of the pigment in the pigment dispersion.

TABLE 4

The effect of soybean oil transesterification on pigment dispersion*

| Dispersion | Acrylates | SBO (%) | Acrylate surface tension (dynes/cm) | Yield stress (Pa) | Dispersibility (NPIRI) |
|---|---|---|---|---|---|
| Example 36 | Polyol-1A | 0 | 42.2 | 1356.0 | 8 |
| Example 37 | Example 9A | 5 | 38.5 | 428.8 | 3 |
| Example 38 | Example-10A | 10 | 36.7 | 232.1 | 3 |
| Example 39 | Example-11A | 15 | 36.0 | 214.9 | 2 |
| Example 40 | Example-12A | 20 | 35.5 | 125.6 | 3 |

*Dispersion: 1.1% SOLSPERSE ®39000, 45% SUNFAST ® Blue 15:4 pigment

Examples 41-42

Other Natural Oil Transesterification

The following examples 41 and 42 illustrate that other natural oils, such as castor oil and epoxidized soybean oil, also reduce the surface tension of the polyester polyol acrylate via transesterification. Details of the pigment dispersions prepared with polyester polyol acrylates transesterified with other natural oils are set forth in Table 5.

TABLE 5

The effect of natural oil transesterification on pigment dispersion*

| Dis-persions | Acrylates | Acrylate composition CO (%) | Acrylate composition ESBO (%) | Acrylate surface tension (dynes/cm) | Yield stress (Pa) | Dipersibility (NPIRI) |
|---|---|---|---|---|---|---|
| Example 41 | Example 13A | 20 | | 36.7 | 397 | 5 |
| Example 42 | Example 14A | | 20 | 38.0 | 631 | 6 |

*Dispersion: 1.1% SOLSPERSE ® 39000, 45% SUNFAST ® Blue 15:4 pigment

Examples 43-46 (Comparative)

Study of Commercially Available Acrylates and Acrylates Prepared with and without Modified Polyols in Pigment Dispersions Acrylates prepared from Polyol-5 and Polyol-6 (no natural oil), Example 12 (Polyol-1 with 20% SBO), and a commercial pigment dispersion resin, expressed as "Commercial A" are used to prepare pigment dispersion formulations. The "Commercial A" resin is an amine modified polyether acrylate with a functionality of 3. It has an OHV of 42 mg KOH/g and a viscosity of 100 cp at 25° C. The pigment dispersions each comprise 1.1% by weight SOLSPERSE® 39000 pigment dispersion agent, and 45% by weight SUNFAST® Blue 15:4 pigment. Example 43 is the pigment dispersion prepared with the "Commercial A" resin, Examples 44 and 45 are the pigment dispersions prepared with Polyol-6A and Polyol-5A, respectively, and Example 46 is the pigment dispersion prepared with Example 12A, which is a natural oil modified polyol acrylate in accordance with the present technology. The properties of each of the pigment dispersions are set forth in Table 6.

TABLE 6

A comparison of commercial acrylate with oil modified polyol acrylates in pigment dispersion*

| Dispersion | Acrylates | Acrylate surface tension (dynes/cm) | Yield Stress (Pa) | Dispersibility (NPIRI) |
|---|---|---|---|---|
| Example 43 | Commercial A | 37.8 | 630 | 3.0 |
| Example 44 | Polyol-6A | 35.6 | 315 | 4.0 |
| Example 45 | Polyol-5A | 35.8 | 50 | 5.0 |
| Example 46 | Example 12A | 35.5 | 126 | 3.0 |

*Dispersion: 1.1% SOLSPERSE ®39000, 45% SUNFAST ® Blue 15:4 pigment

As can be seen from Table 6, the commercial resin has the highest surface tension of the four pigment dispersions, while the pigment dispersion prepared with the natural oil modified polyester polyol acrylate had the lowest surface tension. Moreover, in comparison, the highest yield stress is found in the pigment dispersion using the commercial acrylate.

Examples 47-51

A Comparison of Commercial Resin with Modified Polyol Acrylates in Pigment Dispersions Using Less Pigment The following Examples 47-51 compare pigment dispersions prepared with the "Commercial A" resin used above in Example 43 with pigment dispersions prepared with modified polyol acrylates in accordance with the present technology.

The same basic pigment formulation is employed for each of the Example 47-51 compositions. This formulation includes the acrylate component, two additional monomers, namely EBCRYL® 13 and ODA-N, both available from Cytec (Smyrna, Ga.), SOLSPERSE® 39000 dispersing agent and about 37% by weight pigment, as shown in Table 7 below:

TABLE 7

Pigment dispersion formulation

| Component | Amount by Weight |
|---|---|
| Acrylates | 47.0 |
| EBCRYL ® 113 (Monomer 1) | 6.7 |
| ODA-N (Monomer 2) | 5.5 |
| SOLSPERSE ® 39000 | 4.1 |
| SUNFAST ® Blue 15:4 pigment | 36.7 |

The acrylates used in each of the examples and the resulting properties of each of the pigment dispersions are shown below in Table 8. Also, the properties of the Example 47 dispersion comprising the "Commercial A" acrylate are compared with the properties of the Example 49 and Example 50 dispersions containing SBO. The results are graphically illustrated in FIGS. 1-2.

TABLE 8

Characterization of pigment dispersion

| Dispersions | Acrylates | Composition of acrylates | Acrylate surface tension (dynes/cm) | Yield Stress (Pa) | Dispersibility (NPIRI) |
|---|---|---|---|---|---|
| Example 47 | Commercial A | Polyether | 37.8 | 125.9 | 4.0 |
| Example 48 | Example 29A | w/Fatty acid | 32.6 | 31.6 | 3.0 |
| Example 49 | Example 12A | w/SBO | 35.5 | 15.8 | 3.0 |
| Example 50 | Example 15A | w/SBO | 35.4 | 56.2 | 2.0 |
| Example 51 | Example 13A | w/CO | 36.7 | 12.6 | 3.0 |

From the results shown in Table 8, it can be seen that, although the yield stress is reduced by using less pigment in the pigment dispersions, the "Commercial A" dispersion (Example 47) has the highest yield stress due to its high surface tension. The pigment dispersions made with the modified polyols in accordance with the present technology show much lower yield stress and greater dispersibility. FIG. 1 graphically illustrates that the Example 49 and Example 50 pigment dispersions have better dispersibility, as indicated by NPIRI number, than the dispersibility of the Example 47 "Commercial A" dispersion. The lower the NPIRI number, the better the pigment dispersibility. Both the Example 49 and Example 50 pigment dispersions have low NPIRI numbers (3 and 2, respectively), whereas the Example 47 pigment dispersion has a higher NPIRI number (4), indicating that the pigment dispersiblity of the Example 47 pigment dispersion is not as good as that of Examples 49 and 50.

Figure 2:
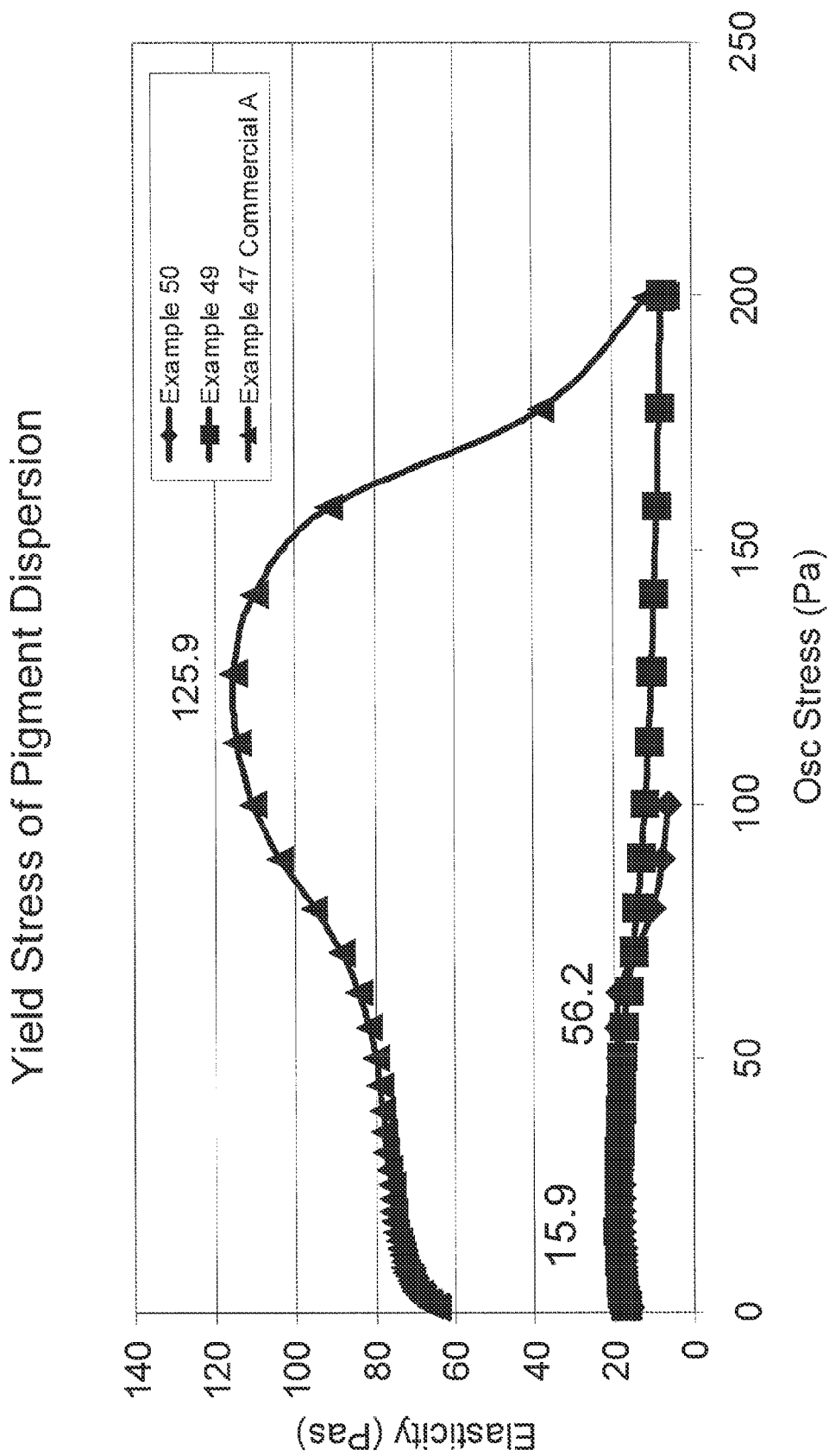
FIG. 2 is a graph comparing the yield stress results for three pigment dispersions.

FIG. 2 graphically illustrates that the pigment dispersions of Examples 49 and 50 have lower yield stresses than the Example 47 pigment dispersion, indicating that the Example 49 and Example 50 pigment dispersions have better pigment wetting than the Example 47 pigment dispersion.

Figure 3:
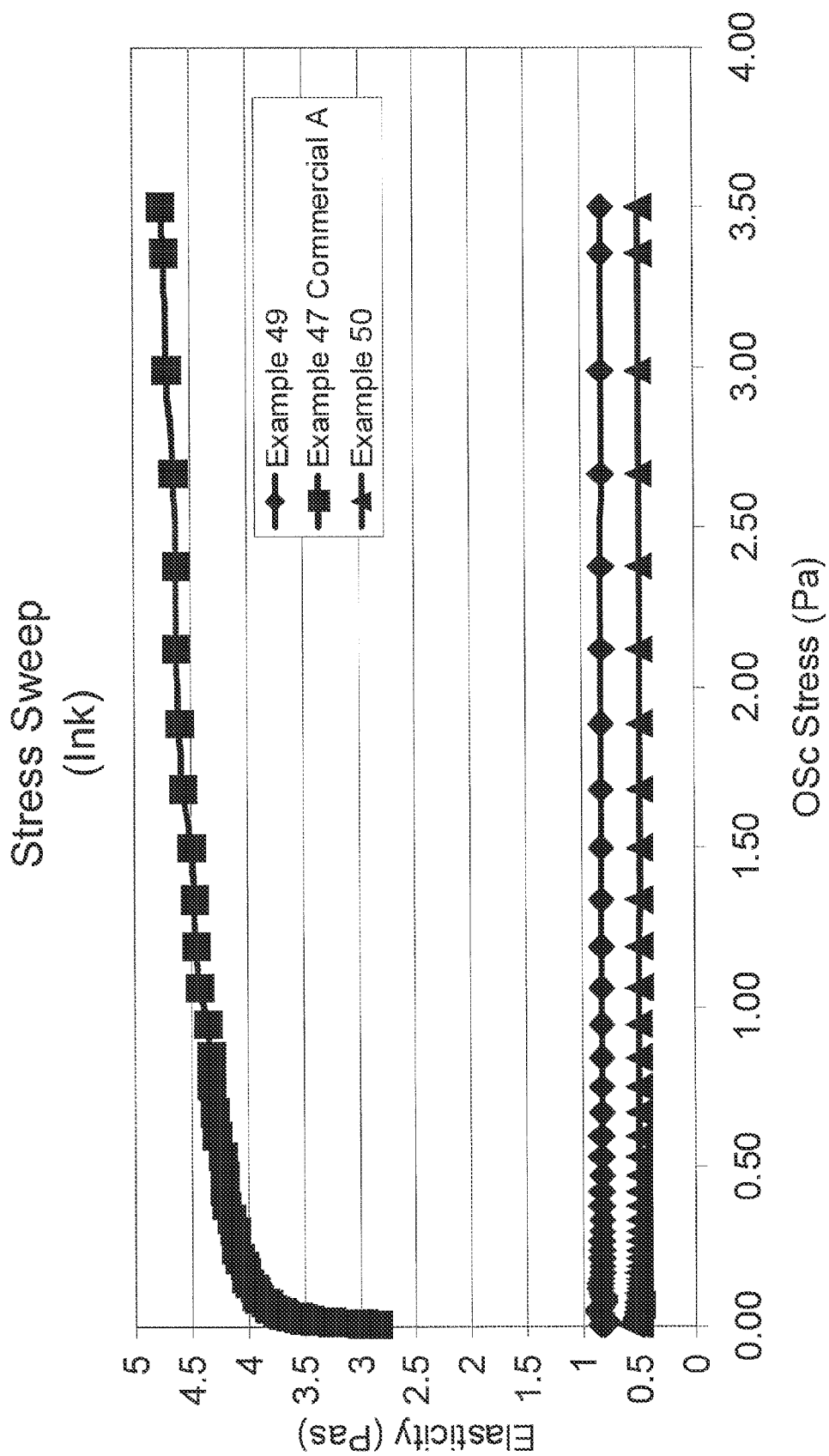
FIG. 3 is a graph comparing the stress sweep results for three ink compositions.

Each of the Example 47, 49 and 50 pigment dispersions are formulated into ink compositions in accordance with the general ink formulation shown in Table 13 (infra). The resulting ink compositions are evaluated for elasticity and the results are shown in FIG. 3. FIG. 3 graphically demonstrates that, when the Examples 47, 49 and 50 pigment dispersions are formulated into ink compositions, the ink compositions comprising the Example 49 and 50 pigment dispersions have a much lower and more stable elasticity than an ink composition formulated with the Example 47 pigment dispersion. This measurement is an indication of the stability of the ink composition. A low elasticity that remains fairly constant in response to increased stress indicates a very stable ink formulation.

Examples 52-55

Other Polyol Acrylates with or without Soybean Oil

The following Examples 52-55 illustrate and compare pigment dispersions formulated with other polyol acrylates prepared with and without soybean oil. In particular, Example 52 is a pigment dispersion prepared with a polyether acrylate, while Example 53 is the same pigment dispersion as Example 52, except that the polyether acrylate has 20% by weight soybean oil incorporated into the backbone of the polyether. Similarly, Example 54 is a pigment dispersion prepared with an aliphatic polyol acrylate, while Example 55 is the same pigment dispersion as Example 54, except that the aliphatic polyol acrylate has 20% by weight soybean oil incorporated into the backbone of the aliphatic polyol. The pigment formulation in Table 7 is employed for each of the Examples 52-55. The properties for each of the dispersions are shown in Table 9.

TABLE 9

Characterization of pigment dispersion

| Dispersions | Acrylates | Composition of acrylate | Acrylate surface tension (dynes/cm) | Yield Stress (Pa) | Dispersibility (NPIRI) |
|---|---|---|---|---|---|
| Example 52 | Polyol-7A | Polyether | 41.6 | 70.8 | 5.5 |
| Example 53 | Example 17A | Polyether/SBO | 36.4 | 31.6 | 5.0 |
| Example 54 | Example 7A | Adipate polyol | 42.0 | 31.6 | 7.0 |
| Example 55 | Example 18A | Adipate polyol/SBO | 35.6 | 17.8 | 5.5 |

As shown in Table 9, the addition of SBO into the polyether or the aliphatic polyol via transesterification dramatically decreases the surface tension of the acrylate, resulting in lower yield stress and better pigment dispersion.

Examples 56-62

Pigment Dispersion with Different Color Pigments

Pigment dispersions are prepared using the basic pigment dispersion formulation from Table 7, except that different color pigments are substituted for the SUNFAST® Blue 15:4 pigment. The same polyester polyol acrylate is used in each of Examples 56-62 and is the acrylated Polyol-1/20% SBO of Example 12A. The pigment dispersions are evaluated for yield stress and dispersibility (NPIRI) and the results are shown below in Table 10.

TABLE 10

Characterization of pigment dispersion with different color

| Dispersions | Colorants | Yield Stress (Pa) | Dispersibility (NPIRI) |
|---|---|---|---|
| Example 56 | Carbon black | 0.4 | <1 |
| Example 57 | Bonithol Red | 14.1 | 1 |
| Example 58 | Lake Red | 25.1 | <1 |
| Example 59 | Irgazin Green | 70.8 | 1 |
| Example 60 | Irgalite Magenta | 199.5 | <1 |
| Example 61 | Violet Pink | 281.8 | 1.5 |
| Example 62 | Diacetanil Orange | 354.8 | 2.0 |

All of the pigment dispersions with different colorants show great dispersibility even though several dispersions have relatively higher yield stresses.

Examples 63-67

Optimization of SBO Content in Polyol-1A

Examples 63-67 show the effect of the amount of soybean oil transesterified into the polyol on the yield stress and pigment dispersibility of the resulting acrylate. For each of the examples, the polyol utilized was Polyol-1, a PA/DEG polyol, and the amount of soybean oil transesterified into the polyol was varied, as shown in Table 11. The polyols were acrylated and evaluated for yield stress and dispersibility in pigment formulations. The results are shown in Table 11.

TABLE 11

Optimizing SBO content

| Dispersions | Acrylate | SBO content (%) | Yield Stress (Pa) | Dispersibility (NPIRI) |
|---|---|---|---|---|
| Example 63 | Example 19A | 5.10 | 44.67 | 6.0 |
| Example 64 | Example 20A | 13.75 | 11.22 | 5.0 |
| Example 65 | Example 21A | 22.50 | 6.31 | 3.5 |
| Example 66 | Example 22A | 31.25 | 11.22 | 3.5 |
| Example 67 | Example 23A | 40.00 | 7.94 | 3.0 |

The results in Table 11 show that higher soybean oil content in the acrylate results in lower yield stress and better pigment dispersibility.

Examples 68-72

Optimization of SBO/DEG Ratio

Examples 68-72 illustrate the effect of the ratio of SBO/DEG in the polyol acrylate on the yield stress and pigment dispersibility properties. For each of Examples 68-72, pigment dispersions were prepared using the DEG/SBO polyols prepared in Examples 24-28 (see Table 2), respectively, followed by acrylation. The yield stress and pigment dispersibility properties for each of the acrylates is shown in Table 12.

TABLE 12

Optimizing SBO/DEG ratio

| Dispersions | Acrylates | SBO/DEG ratio | Yield Stress (Pa) | Dispersibility (NPIRI) |
|---|---|---|---|---|
| Example 68 | Example 24A | 19.0:1 | 3.5 | 2.0 |
| Example 69 | Example 25A | 6.3:1 | 22.2 | 3.5 |
| Example 70 | Example 26A | 3.4:1 | 4.0 | 3.0 |
| Example 71 | Example 27A | 2.2:1 | 3.9 | 2.5 |
| Example 72 | Example 28A | 1.5:1 | 86.7 | 4.0 |

The results in Table 12 show that higher amounts of SBO incorporated into the DEG polyol give better rheological properties for the pigment dispersions.

Examples 73-77

The Effect of SBO Content in Polyol-1A on Ink Using Same Acrylate in Both Dispersion and Letdown Vehicle Examples 73-77 illustrate the effect of the amount of SBO incorporated into the backbone of a polyol when the SBO/polyol is acrylated and used both in the pigment dispersion and as the letdown vehicle for an energy curable ink composition. For each of these examples, pigment dispersions were prepared using acrylated Polyol-1 transesterified with different amounts of SBO. The Polyol-1/SBO polyols used in Examples 73-77 are shown in Examples 19-23 (see Table 2), respectively. The acrylated Polyol-1/SBO polyols are used in formulating the pigment dispersions as well as being used as the letdown vehicle for the energy curable ink composition. Each of the ink compositions of Examples 73-77 are formulated using the general ink formulation shown in Table 13.

TABLE 13

General Ink Formulations

| Component | Amount |
|---|---|
| Pigment Dispersion | 33.2 |
| Letdown Vehicle Resin | 57.9 |
| Photoinitiator (Darocur ® TPO) | 8.9 |

The properties of each of the energy curable ink compositions are shown in Table 14.

TABLE 14

Characterization of inks formulated with SBO

| Inks | Acrylates | SBO content % | shortness index (1.5~2500 1/s) | Initial δ (degree) |
|---|---|---|---|---|
| Example 73 | Example 19A | 5.10 | 3.2 | 81.2 |
| Example 74 | Example 20A | 13.75 | 2.0 | 85.3 |
| Example 75 | Example 21A | 22.50 | 1.8 | 84.1 |
| Example 76 | Example 22A | 31.25 | 2.2 | 85.6 |
| Example 77 | Example 23A | 40.00 | 1.6 | 89.7 |

From Table 14, it can be seen that greater amounts of SBO content in the polyol acrylate help to reduce the elastic component in the ink composition and achieve a higher degree of Newtonian behavior.

Examples 78-82

Different Polyol Acrylates in Ink Using Acrylate in Both Dispersion and Letdown Vehicle Examples 78-82 illustrate the effect of using different polyol acrylates on the properties of the resulting ink composition where the polyol acrylate is used both in the pigment dispersion and as the letdown vehicle for the energy curable ink composition. For Example 78, the polyol acrylate was "Commercial A" acrylate, a polyether acrylate used above in Example 43. For Examples 79-82, the polyol acrylate was prepared from a polyol modified with either natural oil or a fatty acid, in accordance with the present technology. The polyol acrylates were formulated into ink compositions using the general ink formulation shown in Table 13. Each of the ink compositions were evaluated for shortness index, which is calculated by the ratio of low shear viscosity versus high shear viscosity. In general, lower shortness index values are more desirable. In particular, a desirable shortness index value is a shortness index of about 10 or less, alternatively about 5 or less, alternatively about 4 or less, alternatively about 3 or less, alternatively about 2 or less for the ink composition. The ink compositions and results are shown in Table 15.

TABLE 15

Characterization of inks formulated with SBO

| Inks | Acrylates | Composition of acrylate | shortness index (1.5~2500 1/s)' | Initial δ (degree) |
|---|---|---|---|---|
| Example 78 | Commercial A | Polyether | 17 | 40.7 |
| Example 79 | Example 29A | w/Fatty acid | 2 | 81.7 |
| Example 80 | Example 12A | w/SBO | 1 | 81.3 |

TABLE 15-continued

Characterization of inks formulated with SBO

| Inks | Acrylates | Composition of acrylate | shortness index (1.5~2500 1/s)' | Initial δ (degree) |
|---|---|---|---|---|
| Example 81 | Example 15A | w/SBO | 2 | 81.7 |
| Example 82 | Example 13A | w/CO | 1 | 85.9 |

The ink made from the "Commercial A" acrylate shows much less Newtonian behavior in comparison with inks made from the modified polyol acrylates in accordance with the present technology.

Examples 83-89

A Comparison with Commercial Ink I

Dispersions were prepared on a three roll mill at 37% pigment. The pigment dispersion formulations are shown below in Table 16. Pigment dispersion A was formulated with the "Commercial A" acrylate, pigment dispersions B and C were formulated with polyol acrylates that contained no natural oil, and pigment dispersion D was formulated with a polyol acrylate (Example 12A) that contained 20% by weight SBO in the modified polyol.

TABLE 16

Dispersion formulations

| Materials | Description | A | B | C | D |
|---|---|---|---|---|---|
| Commercial A | Oligomer | 47.00 | | | |
| Polyol-5A | Oligomer | | 47.00 | | |
| Example 1A | Oligomer | | | 47.00 | |
| Example 12A | Oligomer | | | | 47.00 |
| EBCRYL ® 113 | Monomer | 6.67 | 6.96 | 6.96 | 6.96 |
| ODA-N | Monomer | 5.50 | 5.74 | 5.74 | 5.74 |
| SUNFAST ® Blue 15:4 pigment | Pigment | 36.67 | 36.67 | 36.67 | 36.67 |
| SOLSPERSE ®39000 | Dispersion agent | 4.16 | 4.17 | 4.17 | 4.17 |

Figure 4:
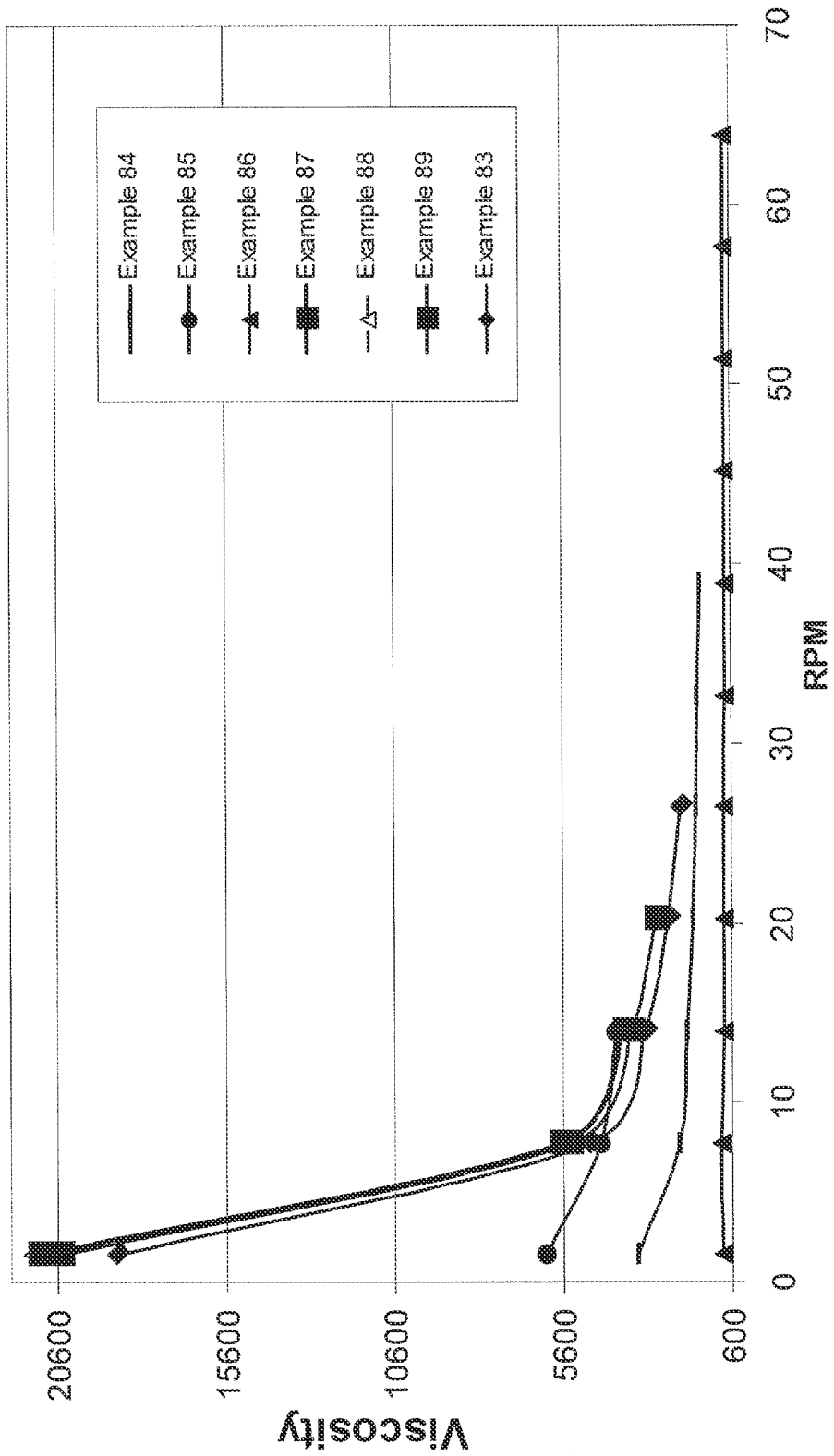
FIG. 4 is a graph comparing the viscosities of several different ink compositions.

The Table 16 pigment dispersions A, B, C and D were each formulated into energy curable ink compositions. The formulations for each of the energy curable ink compositions are shown in Table 17. For each of the energy curable ink compositions of Examples 83-86, the polyol acrylate used to formulate the pigment dispersion was also used as the letdown vehicle. Example 86 comprises pigment dispersion D, made in accordance with the present technology, as well as Example 12A, containing natural oil (SBO), as the letdown vehicle. For the energy curable ink compositions of Examples 87-89, the "Commercial A" polyol acrylate was used as the letdown vehicle. Each of the ink formulations was evaluated for shortness index and viscosity. The shortness index results are shown in Table 17. The viscosity results are depicted graphically in FIG. 4.

An ideal ink is a Newtonian fluid, meaning that the viscosity of the fluid does not change with shear rate. As can be seen in the FIG. 4 graph, the Example 86 ink composition exhibits a flat curve, indicating that the viscosity of the ink does not change with shear rate. The Example 86 ink composition therefore has a much greater degree of Newtonian behavior than the other inks formulated without a natural oil component.

The shortness index is used to quantitatively describe how close to Newtonian behavior a fluid is. The shortness index is the ratio of low shear viscosity versus high shear viscosity. The lower the shortness index, the more "Newtonian" the fluid is. As can be seen from the results shown in Table 17, the Example 86 ink composition has a shortness index of 1.0, which is lower than the values obtained for the other ink composition examples. Visually, the Example 86 ink composition also demonstrated a strong color and high gloss.

TABLE 17

Formulations and characterization of inks

| Inks | Description | 83 | 84 | 85 | 86 | 87 | 88 | 89 |
|---|---|---|---|---|---|---|---|---|
| Dispersion A | Pigment dispersion | 33.22 | | | | 33.22 | | |
| Dispersion B | Pigment dispersion | | 33.22 | | | | 33.22 | |
| Dispersion C | Pigment dispersion | | | 33.22 | | | | 33.22 |
| Dispersion D | Pigment dispersion | | | | 33.22 | | | |
| Commercial A | Oligomer | 55.37 | | | | 55.37 | 55.37 | 55.37 |
| Polyol 5A | Oligomer | | 55.37 | | | | | |
| Example 1A | Oligomer | | | 55.37 | | | | |
| Example 12A | Oligomer | | | | 55.37 | | | |
| ESACURE ® KTO 46 | Photoinitiator | 8.86 | 8.86 | 8.86 | 8.86 | 8.86 | 8.86 | 8.86 |
| Rad ® 2650 | Surfactant | 0.45 | 0.45 | 0.45 | 0.45 | 0.45 | 0.45 | 0.45 |
| Rad ® 2250 | Surfactant | 0.45 | 0.45 | 0.45 | 0.45 | 0.45 | 0.45 | 0.45 |
| ULTRAGLIDE ® UV 704 | Dispersion agent | 0.55 | 0.55 | 0.55 | 0.55 | 0.55 | 0.55 | 0.55 |
| EVERGLIDE ® UV 691 | Wax | 1.10 | 1.10 | 1.10 | 1.10 | 1.10 | 1.10 | 1.10 |
| shortness index | 1.5~13.97 rpm | 5.9 | 1.8 | 1.5 | 1.0 | 5.6 | 5.5 | 5.7 |

Examples 90-91

A Comparison of Ink Composition with 50% Less Pigment in Dispersion Versus a Commercial Ink A pigment dispersion was prepared utilizing the Example 12A polyol acrylate and pigment loading of 18.33%, which is 50% less than the pigment loading used for pigment dispersions A-D. The pigment dispersion for this example is shown below in Table 18 as dispersion E.

TABLE 18

Dispersion formulation

| Materials | Description | E |
| --- | --- | --- |
| Example 12A | Oligomer | 65.34 |
| EBCRYL ® 113 | Monomer | 6.67 |
| ODA-N | Monomer | 5.50 |
| SUNFAST ® Blue 15:4 | Pigment | 18.33 |
| SOLSPERSE ®39000 | Dispersion agent | 4.16 |

The pigment dispersion E, shown in Table 18 and pigment dispersion A, shown in Table 16, were each formulated into an energy curable ink composition. The energy curable ink formulations are shown in Table 19, along with shortness index, color density and gloss results for each of the ink compositions. The viscosity results for the two ink compositions are shown graphically in FIG. 5.

TABLE 19

Formulations and characterization of inks

| Inks | Description | 90 | 91 |
| --- | --- | --- | --- |
| Dispersion A | Pigment dispersion | 33.22 | |
| Dispersion E | Pigment dispersion | | 33.22 |
| Commerical A | Oligomer | 55.37 | |
| Example 12A | Oligomer | | 55.37 |
| ADDITOL ® LX | Photoinitiator | 8.86 | 8.86 |
| Rad ® 2650 | Surfactant | 0.45 | 0.45 |
| Rad ® 2250 | Surfactant | 0.45 | 0.45 |
| ULTRAGLIDE ® UV 704 | Dispersion agent | 0.55 | 0.55 |
| EVERGLIDE ® UV 691 | Wax | 1.10 | 1.10 |
| shortness index | 1.5~63.87 rpm | 12 | 1 |
| Color density | | 2.14 | 2.21 |
| Gloss (60° C.) | | 65.5 | 92.0 |

Figure 5:
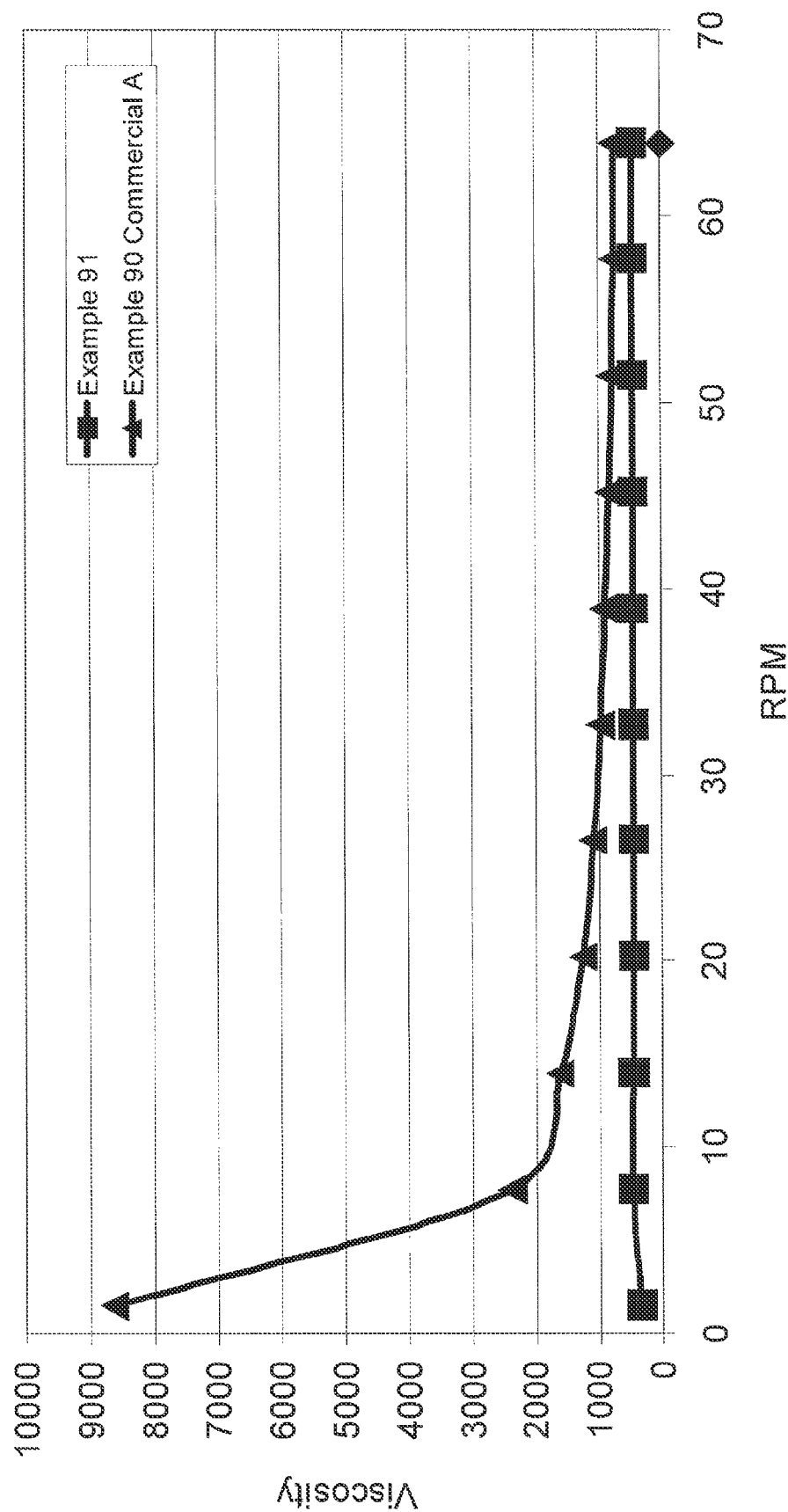
FIG. 5 is a graph comparing the viscosity of an ink composition prepared in accordance with the present technology with that of an ink composition prepared with a commercially available acrylate.

As can be seen from FIG. 5, the Example 91 ink composition demonstrates a very flat curve and less shear thinning up to a high shear rate. This bodes well for high color strength on an ink press. From the test results shown in Table 19, the Example 91 ink has a lower shortness index, better color density and better gloss, even though the ink has 50% less pigment than the Example 90 ink. Moreover, the Example 90 ink looks weaker when printed compared to the Example 91 ink even though it visually appears to be thicker than Example 91.

Examples 92-94

Comparative

Additional comparative pigment dispersions were prepared at 37% pigment loading. The pigment dispersion formulations are shown below in Table 20 as dispersions F, G and H. None of these pigment dispersions contained natural oil in the polyol acrylate.

TABLE 20

Dispersion formulations

| Materials | Description | F | G | H |
| --- | --- | --- | --- | --- |
| Example 5A | Oligomer | 47.00 | | |
| Example 3A | Oligomer | | 47.00 | |
| Commercial A | Oligomer | | | 47.00 |
| EBCRYL ® 113 | Monomer | 6.67 | 6.96 | 6.96 |
| ODA-N | Monomer | 5.50 | 5.74 | 5.74 |
| SUNFAST ® Blue 15:4 | Pigment | 36.67 | 36.67 | 36.67 |
| SOLSPERSE ®39000 | Dispersion agent | 4.16 | 4.17 | 4.17 |

The Table 20 pigment dispersions F, G and H were each formulated into an energy curable ink composition. The formulation for each of the energy curable ink compositions is shown in Table 21. Each of the ink compositions used the same letdown vehicle, Ebcryl® 81, available from Cytec (Smyrna, Ga.). The Example 92-94 ink compositions in Table 21 were evaluated along with the Example 91 ink composition from Table 19 for stress sweep step, strain sweep step, frequency sweep step, and continuation ramp step. The results of these tests are shown graphically in FIGS. 6 to 9, respectively.

TABLE 21

Formulations and characterization of inks

| Materials/Properties | Description | 92 | 93 | 94 |
| --- | --- | --- | --- | --- |
| Dispersion F | Pigment dispersion | 33.22 | | |
| Dispersion G | Pigment dispersion | | 33.22 | |
| Dispersion H | Pigment dispersion | | | 33.22 |
| Ebecryl ® 81 | Oligomer | 55.37 | 55.37 | 55.37 |
| ADDITOL ® DX | Photoinitiator | 8.86 | 8.86 | 8.86 |
| Rad ® 2650 | Surfactant | 0.45 | 0.45 | 0.45 |
| Rad ® 2250 | Surfactant | 0.45 | 0.45 | 0.45 |
| ULTRAGLIDE ® UV 704 | Dispersion agent | 0.55 | 0.55 | 0.55 |
| EVERGLIDE ® UV 691 | Wax | 1.10 | 1.10 | 1.10 |
| MEK double rub[1] | | 4 | 7 | 7 |
| Color Density | | 2.15 | 2.15 | 2.14 |
| Gloss (60°) | | 69 | 69 | 65.5 |

[1]Results of three samples added together.

Figure 6:
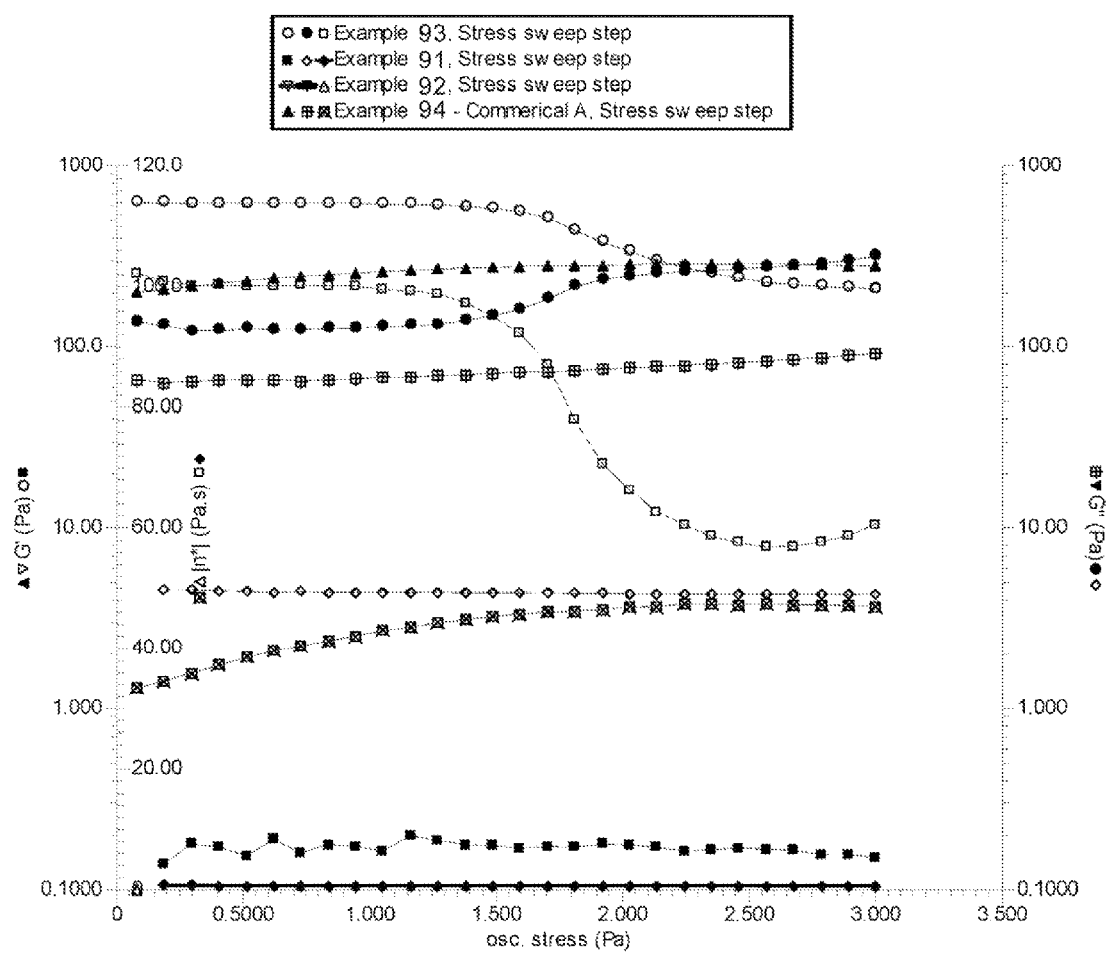
FIG. 6 is a graph comparing the stress sweep of an ink composition prepared in accordance with the present technology with that of ink compositions prepared with no natural oil component.

As can be seen from the FIG. 6 graph, the Example 91 ink composition in accordance with the present technology, unlike the other ink formulations, demonstrates a higher viscous component (G") than an elastic component (G'). Moreover, the Example 91 viscous and elastic components are much lower than those from the other formulations. Visually, proofs of the Example 91 composition versus the other formulations show that the Example 91 composition is glossier, smoother in lay, brighter in color, and stronger in color even though the pigment loading in the ink is 50% reduced.

Figure 7:
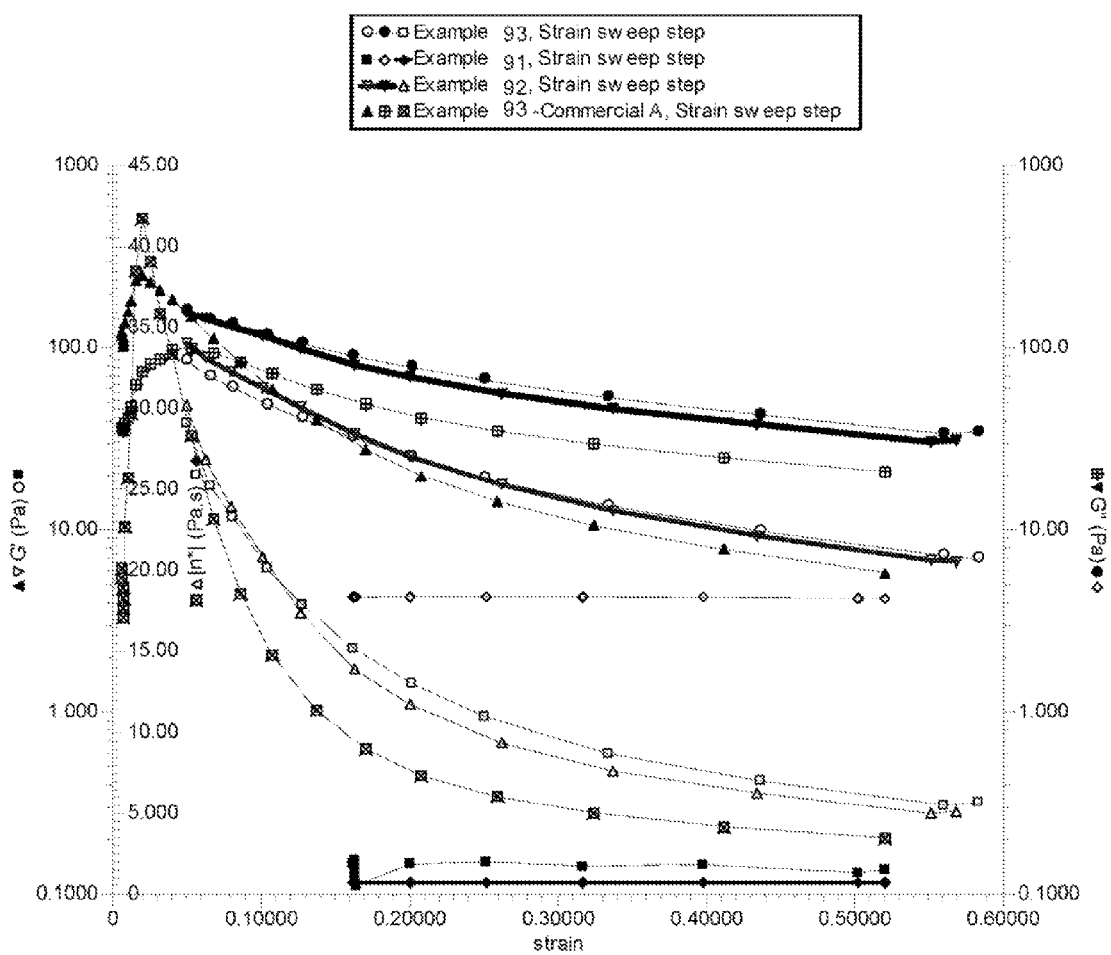
FIG. 7 is a graph comparing the strain sweep of the same ink compositions as depicted in FIG. 6.

The FIG. 7 graph shows that the Example 91 ink has flat curves of complex viscosity (|n*|), elasticity (G'), and viscous (G") components, demonstrating that the ink is an extremely stable ink and much more viscous than elastic (G"/G'>1).

Figure 8:
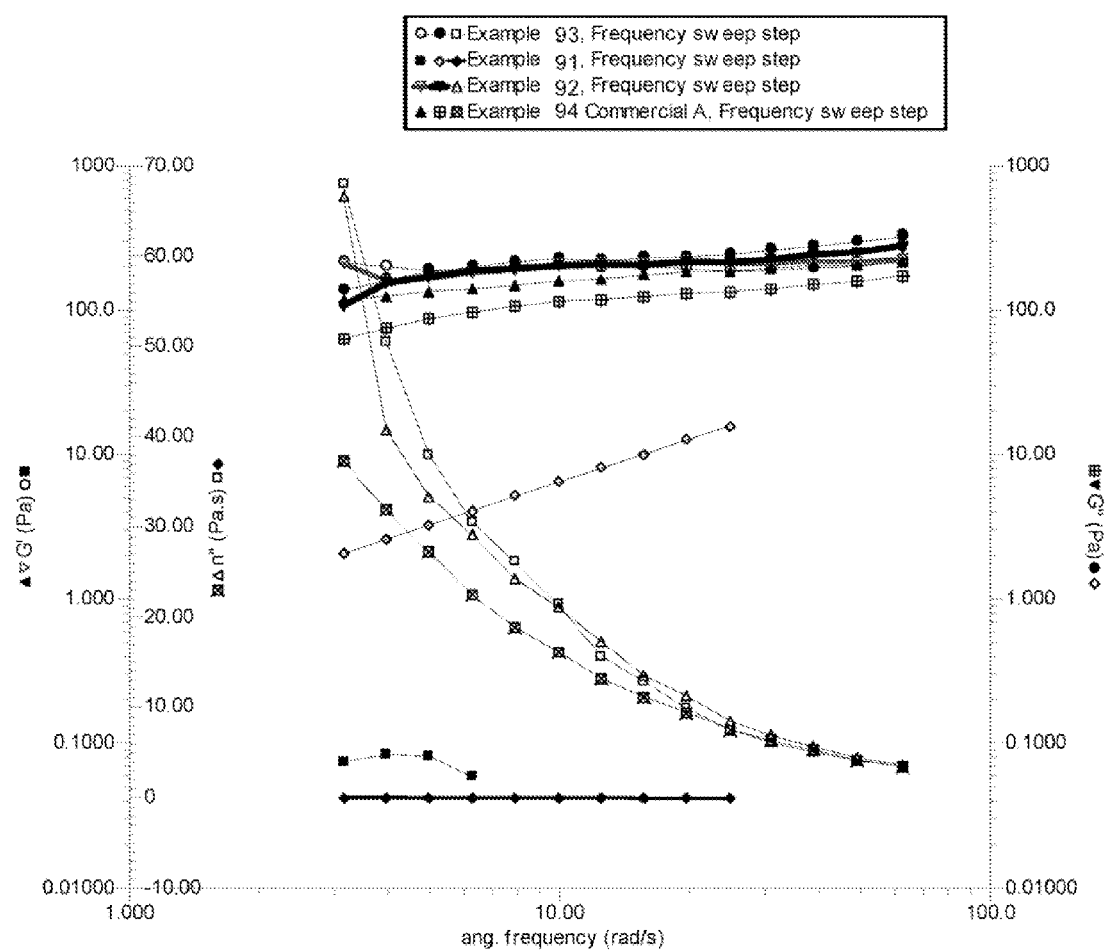
FIG. 8 is a graph comparing the frequency sweep of the same ink compositions as depicted in FIG. 6.

The FIG. 8 graph shows that when the frequency of oscillation is altered, the complex viscosity (|n*|) of the Example 91 ink is stable; while the other ink compositions see a drop is viscosity with increased frequency.

Figure 9:
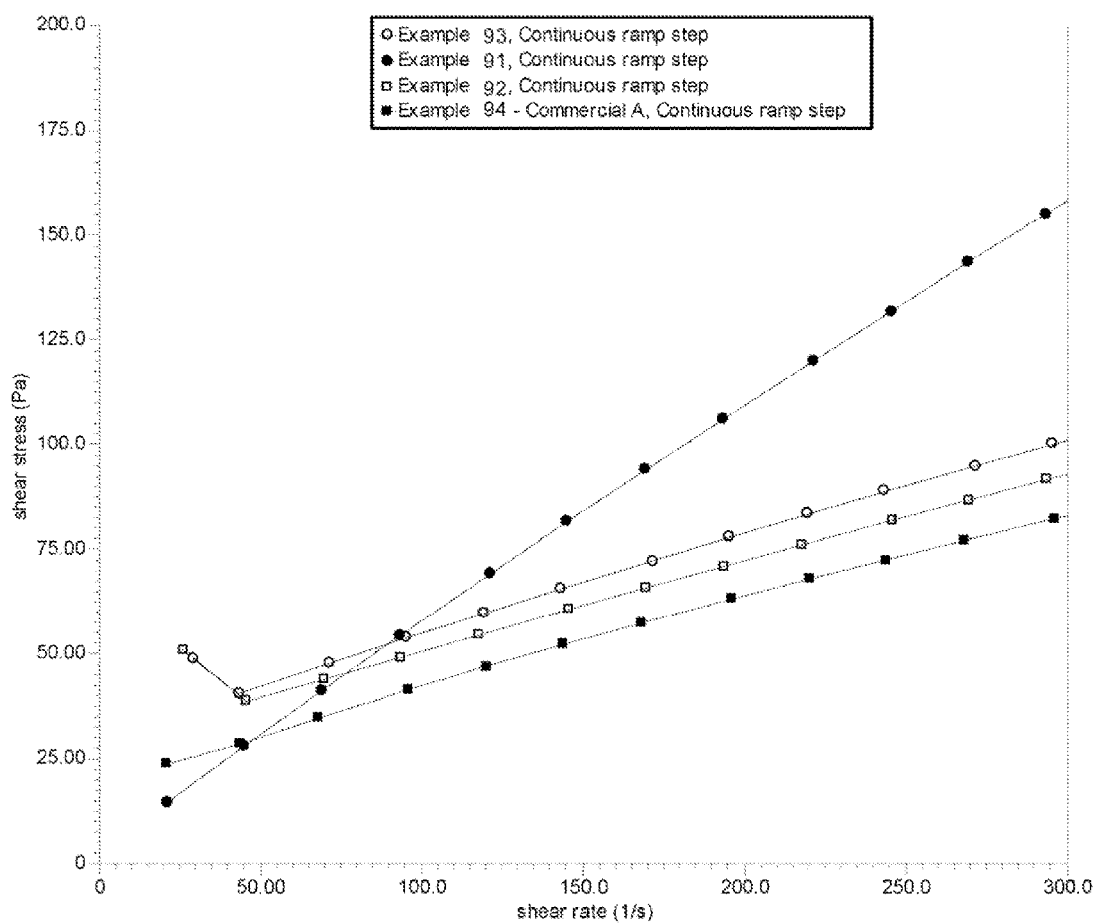
FIG. 9 is a graph comparing the continuous ramp step of the same ink compositions as depicted in FIG. 6.

From FIG. 9, it can be seen that the Example 91 ink has a steeper slope and is closer to passing through the origin, indicative of a much higher degree of Newtonian behavior than the other inks.

Examples 95-97

A Comparison with Commercial Ink II

Pigment dispersions were prepared on a three roll mill at 37% pigment loading. The pigment dispersion formulations are shown below in Table 22. The "Commercial B" acrylate used in dispersion J is a commercially available polyester acrylate with six functionalities. Its AV and viscosity are 10 mg KOH/g and 8,000 cp at 25° C., respectively. The polyol acrylates used in dispersions I and K were prepared from modified polyols incorporating natural oils in the polyol backbone in accordance with the present technology.

TABLE 22

Dispersion formulations

| Materials | Description | I | J | K |
|---|---|---|---|---|
| Example 12A | Oligomer | 47.00 | | |
| Commercial B | Oligomer | | 47.00 | |
| Example 15 | Oligomer | | | 47.00 |
| EBCRYL ® 113 | Monomer | 6.67 | 6.96 | 6.96 |
| ODA-N | Monomer | 5.50 | 5.74 | 5.74 |
| SUNFAST ® Blue 15:4 | Pigment | 36.67 | 36.67 | 36.67 |
| SOLSPERSE ®39000 | Dispersion agent | 4.16 | 4.17 | 4.17 |

Figure 10:
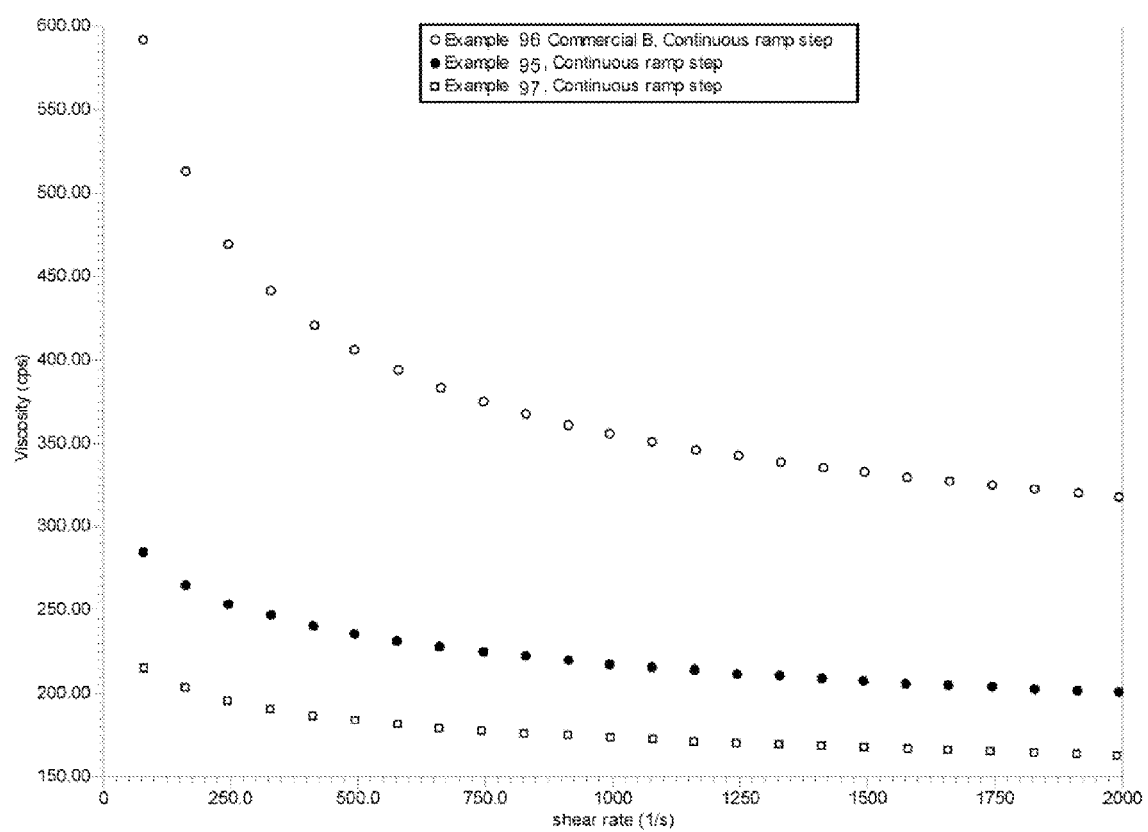
FIG. 10 is a graph comparing the continuous ramp step of two ink compositions made in accordance with the present technology, with that of an ink composition prepared with a commercially available acrylate.

The Table 22 pigment dispersions I, J and K were each formulated into an energy curable ink composition. The formulation for each composition is shown in Table 23 as Examples 95, 96 and 97, respectively. Each of the ink compositions used the same letdown vehicle, Genomer® 3364, a three functionality monomer available from Rahn (Aurora, Ill.). The ink compositions of Examples 95, 96 and 97 were evaluated for shortness index, MEK, Gloss, scratch resistance and print density. The test results are shown in Table 23. The ink compositions were also evaluated for viscosity. The viscosity test results are shown graphically in FIG. 10.

TABLE 23

Formulations and characterization of inks

| Materials/Properties | Description | 95 | 96 | 97 |
|---|---|---|---|---|
| Dispersion I | Pigment dispersion | 33.22 | | |
| Dispersion J | Pigment dispersion | | 33.22 | |
| Dispersion K | Pigment dispersion | | | 33.22 |
| GENOMER ® 3364 | Oligomer | 55.37 | 55.37 | 55.37 |
| ADDITOL ® DX | Photoinitiator | 8.86 | 8.86 | 8.86 |
| Rad ® 2650 | Surfactant | 0.45 | 0.45 | 0.45 |
| Rad ® 2250 | Surfactant | 0.45 | 0.45 | 0.45 |
| ULTRAGLIDE ® UV 704 | Dispersion agent | 0.55 | 0.55 | 0.55 |
| EVERGLIDE ® UV 691 | Wax | 1.10 | 1.10 | 1.10 |
| shortness index | 75~200 (1/s) | 1 | 2 | 1 |
| MEK[1] | | 13 | 15 | 13 |
| Gloss (60° C.) | | 81.3 | 72.7 | 80.3 |
| Scratch resistance | | Excellent | Excellent | Excellent |
| Print density | | 1.91 | 1.81 | 1.92 |

[1]Results of three samples added together.

From the results shown in Table 23, it can be seen that the Example 95 and Example 97 inks, made in accordance with the present technology, have a better shortness index, better gloss, and better print density than the "Commercial B" polyester acrylate. This result is surprising because, in general, higher functionality acrylates, such as the "Commercial B" polyester acrylate with six functionalities, have better overall properties than acrylates having lower functionalities. As a result, acrylates having higher functionalities are typically more expensive than acrylates having lower functionalities. The polyester polyol acrylates used in Examples 95 and 97, however, have functionalities of about 2. Thus, the polyester polyol acrylates of the present technology can achieve equal or better properties than higher functionality acrylates at a lower cost. The viscosity results shown in FIG. 10 demonstrate that the Example 95 and Example 97 ink composition have lower viscosity and less shear thinning than the ink composition made from the "Commercial B" acrylate.

While the presently described technology will be described in connection with one or more preferred embodiments, it will be understood by those skilled in the art that the technology is not limited to only those particular embodiments. To the contrary, the presently described technology includes all alternatives, modifications, and equivalents as may be included within the spirit and scope of the appended claims.

What is claimed is:

1. A pigment dispersion comprising:
   at least one polyol acrylate having a surface tension of less than 40 dynes/cm, wherein the polyol acrylate is the reaction product of a modified polyol and an equal or excess molar amount of a (meth)acrylic acid or a derivative thereof, wherein the modified polyol has an Acid Value in the range of 0.22 mg KOH/g to 2.48 mg KOH/g, a viscosity in the range of 51 cps to 1,955 cps at 25° C., and is a reaction product of a natural oil or fatty carboxylic acid or derivative thereof reacted with a polyol selected from the group consisting of polyether polyols, polyester polyols, polyester ether polyols, and polyalcohols, such that the natural oil or fatty carboxylic acid or derivative thereof is incorporated into the backbone of the polyol in an amount, based on the weight of the polyol, of about 5% to about 90% by weight for the natural oil or 10% to 90% by weight for the fatty carboxylic acid or derivative; and
   from 15% to about 75% by weight of at least one pigment;
   wherein the pigment dispersion has a yield stress of less than about 400 Pa.

2. The pigment dispersion of claim 1, wherein the polyol is at least one polyester polyol that is a reaction product of a polyacid or derivative thereof, and a polyalcohol.

3. The pigment dispersion of claim 2, wherein the polyacid or derivative thereof is selected from the group consisting of phthalic acid, phthalic anhydride, isophthalic acid, terephthalic acid, methyl esters of phthalic acid, dimethyl phthalate, polyethylene terephthalate, trimellitic anhydride, pyromellitic dianhydride, pyromellitic acid, maleic acid, maleic anhydride, fumaric acid, itaconic acid, adipic acid, glutaric acid, azealic acid, sebacic acid, dimer acid, and cyclohexanedicarboxylic acid and mixtures thereof.

4. The pigment dispersion of claim 2, wherein the polyalcohol is selected from the group consisting of C2-C20 aliphatic and aromatic diols, 1,2-propane-diol, 1,3-propanediol, dipropylene glycol, tripropylene glycol, ethylene glycol, diethylene glycol, triethyleneglycol, tetraethylene glycol, 1,4-butanediol, neopentyl glycol, 1,6-hexanediol, dihydroxymethyl cyclohexane, 2-butyl-2-ethyl-1,3 propandiol, polyethylene glycol, polypropylene glycol, glycerol, trimethylolpropane, pentaerythritol, higher functional polyalcohols and mixtures thereof.

5. The pigment dispersion of claim 2, wherein the polyester polyol is the reaction product of a phthalic anhydride and a glycol selected from the group consisting of dipropylene glycol, tripropylene glycol, diethylene glycol, triethylene glycol, tetraethylene glycol, polyethylene glycol, polypropylene glycol, and mixtures thereof.

6. The pigment dispersion of claim 1, wherein the polyol is at least one polyester ether polyol that is a reaction product of a polyacid or derivative thereof, a polyalcohol, and ethylene oxide, propylene oxide, butylene oxide, and mixtures thereof.

7. The pigment dispersion of claim 1, wherein the polyol is a polyalcohol selected from the group consisting of diethylene glycol, triethylene glycol, glycerin, dipropylene glycol, tripropylene glycol, polyethylene glycol, polypropylene glycol, pentaerythritol, higher functional polyalcohols and mixtures thereof.

8. The pigment dispersion of claim 1, wherein the polyol is at least one polyether polyol that is a reaction product of a polyalcohol and an alkylene oxide.

9. The pigment dispersion of claim 1, wherein the polyol is end-capped with a molecule selected from the group consisting of lactides, C2 to C25 aliphatic hydroxycarboxylic acids, maleic anhydride, isocyanates, C2 to C3 alkyl carbonates, and mixtures thereof.

10. The pigment dispersion of claim 1, wherein the polyol further comprises a chain-extension agent selected from group consisting of δ-valerolactone, ε-caprolactone and alkyl substituted ε-caprolactone.

11. The pigment dispersion of claim 1, wherein the (meth)acrylic acid or derivative thereof has the following structural formula:

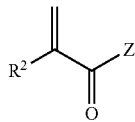

wherein R² is hydrogen, methyl or ethyl, aromatic, or C3 to C20 straight or branched alkyl, and Z is chloride, bromide, hydroxyl, ester or a mixture thereof.

12. The pigment dispersion of claim 1, wherein the modified polyol has an iodine value of 0 to about 175.

13. The pigment dispersion of claim 1, wherein the polyol acrylate has a molecular weight of about 100 to about 50,000 Daltons.

14. An energy curable ink composition comprising:
(a) a pigment dispersion comprising
 (i) at least one polyol acrylate having a surface tension of less than 40 dynes/cm, wherein the polyol acrylate is the reaction product of a modified polyol and an equal or excess molar amount of a (meth)acrylic acid or derivative thereof, wherein the modified polyol has an Acid Value in the range of 0.22 mg KOH/g to 2.48 mg KOH/g, a viscosity in the range of 51 cps to 1.955 cps at 25° C., and is a reaction product of a natural oil or fatty carboxylic acid or derivative thereof reacted with a polyol selected from the group consisting of polyester polyols, polyether polyols, polyester ether polyols and polyalcohols, such that the natural oil or carboxylic acid or derivative thereof is incorporated into the backbone of the polyol in an amount, based on the weight of the polyol, of about 5% to about 90% by weight for the natural oil or about 10% to about 90% by weight for the fatty carboxylic acid or derivative; and
 (ii) from 15% to about 75% by weight of the dispersion of at least one pigment;

wherein the pigment dispersion has a yield stress of less than about 400 Pa;
(b) an optional liquid resin; and
(c) optionally, at least one photoinitiator;
wherein the energy curable ink composition has a shortness index of about 5 or less.

15. The ink composition of claim 14, wherein the liquid resin is selected from the group consisting of polyol acrylates, epoxy acrylates, polyurethane acrylates, acrylic acrylates, silicone acrylates, and mixtures thereof.

16. The ink composition of claim 15, wherein the liquid resin comprises a polyol acrylate that has the same composition as the at least one polyol acrylate in the pigment dispersion.

17. The energy curable ink composition of claim 14, wherein the pigment dispersion comprises about 15% to about 95% by weight of the ink composition.

18. The energy curable ink composition of claim 14, wherein the amount of polyol acrylate in the pigment dispersion is about 10% to about 70% by weight of the pigment dispersion.

19. An energy curable ink composition comprising:
(a) at least one polyol acrylate having a surface tension of less than 40 dynes/cm, wherein the polyol acrylate is the reaction product of a modified polyol and an equal or excess molar amount of a (meth)acrylic acid or derivative thereof, wherein the modified polyol has an Acid Value in the range of 0.22 mg KOH/g to 2.48 mg KOH/g, a viscosity in the range of 51 cps to 1,955 cps at 25° C., and is a reaction product of a natural oil or fatty carboxylic acid or derivative thereof reacted with a polyol selected from the group consisting of polyester polyols, polyether polyols, polyester ether polyols and polyalcohol, such that the natural oil or carboxylic acid or derivative thereof is incorporated into the backbone of the polyol in an amount, based on the weight of the polyol, of about 5% to about 90% by weight for the natural oil or about 10% to about 90% by weight for the fatty carboxylic acid or derivative, and
(b) optionally, at least one liquid resin;
(c) at least one pigment in an amount of from about 5% to about 50% by weight of the ink composition; and
(d) optionally, at least one photoinitiator;
wherein the energy curable ink composition has a shortness index of about 5 or less.

20. The ink composition of claim 19, wherein the polyol acrylate comprises about 1% to about 90% by weight of the ink composition.

21. The ink composition of claim 19, wherein the liquid resin is selected from the group consisting of polyol acrylates, epoxy acrylates, polyurethane acrylates, acrylic acrylates, silicone acrylates, and mixtures thereof.

22. The ink composition of claim 19, wherein the liquid resin comprises about 20% to about 70% by weight of the ink composition.

23. The energy curable ink composition of claim 19, wherein the photoinitiator comprises about 2% to about 20% by weight of the ink composition.

24. The pigment dispersion of claim 1, wherein the pigment dispersion has a pigment dispersibility represented by an NPIRI number of 4 or less.

25. The pigment dispersion of claim 1, wherein the at least one pigment comprises 15% to 50% by weight of the dispersion.

26. The ink composition of claim 14, wherein the at least one pigment comprises 15% to 50% by weight of the dispersion.

27. The energy curable ink composition of claim 19, wherein the at least one pigment comprises 10% to 40% by weight of the ink composition.

\* \* \* \* \*